United States Patent
Tanaka

(10) Patent No.: US 7,113,542 B2
(45) Date of Patent: Sep. 26, 2006

(54) IMAGE EDITING APPARATUS AND IMAGE EDITING METHOD

(75) Inventor: Mitsumasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 449 days.

(21) Appl. No.: 10/052,521

(22) Filed: Jan. 23, 2002

(65) Prior Publication Data
US 2002/0097272 A1    Jul. 25, 2002

(30) Foreign Application Priority Data
Jan. 24, 2001    (JP)    ............... 2001-015343

(51) Int. Cl.
H04N 7/12    (2006.01)
H04N 11/02    (2006.01)

(52) U.S. Cl. .............. 375/240.01; 375/240.13
(58) Field of Classification Search .......... 375/240.01, 375/240.15, 240.25, 240.13; 386/52; 725/48; 382/238
See application file for complete search history.

(56) References Cited

U.S. PATENT DOCUMENTS

| | | | | |
|---|---|---|---|---|
| 5,822,024 A | * | 10/1998 | Setogawa et al. | 348/425.1 |
| 6,104,441 A | * | 8/2000 | Wee et al. | 375/240.15 |
| 6,229,851 B1 | * | 5/2001 | Cotton | 375/240.25 |
| 6,275,618 B1 | * | 8/2001 | Kodama | 382/238 |
| 6,823,010 B1 | * | 11/2004 | Curet et al. | 375/240.12 |
| 2002/0154694 A1 | * | 10/2002 | Birch | 375/240.05 |

FOREIGN PATENT DOCUMENTS

| | | |
|---|---|---|
| JP | 8-18912 | 1/1996 |
| JP | 8-70422 | 3/1996 |
| JP | 08205174 A | * 8/1996 |
| JP | 11-112980 | 4/1999 |
| JP | 11-187410 | 7/1999 |
| JP | 11-275583 | 10/1999 |

OTHER PUBLICATIONS

Japanese Office Action dated Dec. 25, 2003 with English translation of pertinent portions.

* cited by examiner

Primary Examiner—Gims Philippe
Assistant Examiner—Erick Rekstad
(74) Attorney, Agent, or Firm—Whitham, Curtis, Christofferson & Cook P.C.

(57) ABSTRACT

An image editing apparatus which edits image data coded by an MPEG method includes an image encoder which codes the image data, an image decoder which decodes the coded image data, and an image data analyzer which determines an attribute of each GOP and a type of each image frame. The image data analyzer determines whether a head GOP of an area to be edited is a closed GOP or not. In a case where the image data analyzer determines that the head GOP is not a closed GOP, the image encoder converts a portion near the head of the area to be edited into a closed GOP.

33 Claims, 13 Drawing Sheets

FIG. 2
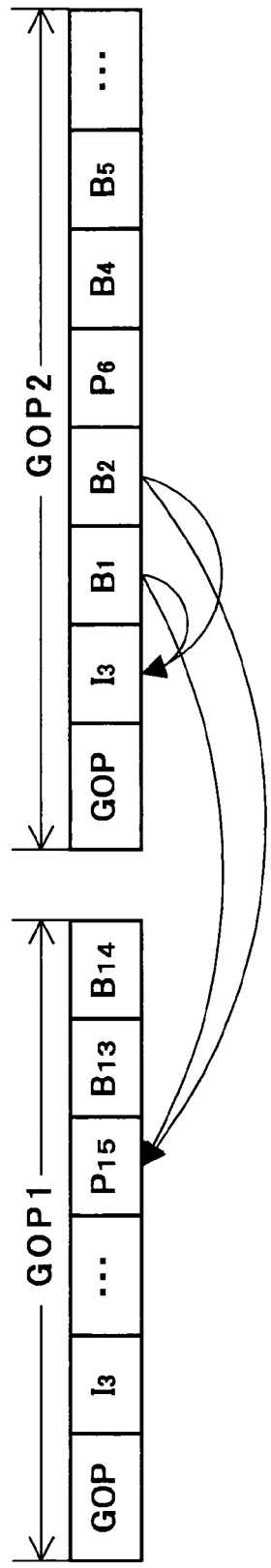
FIG. 3A
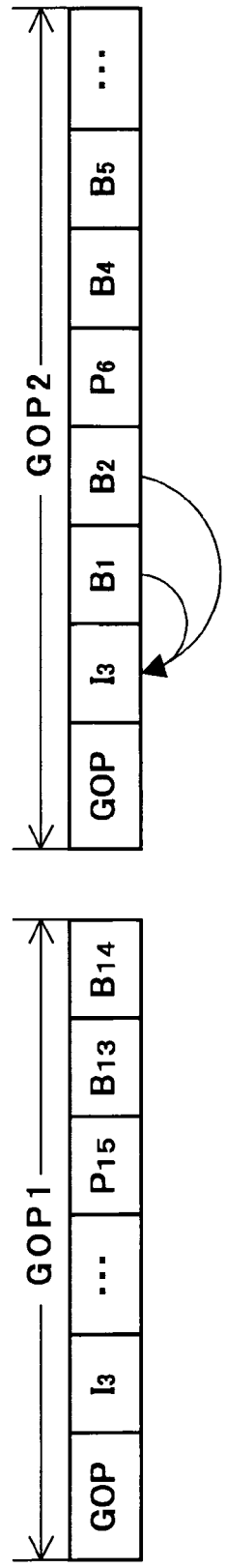
FIG. 3B

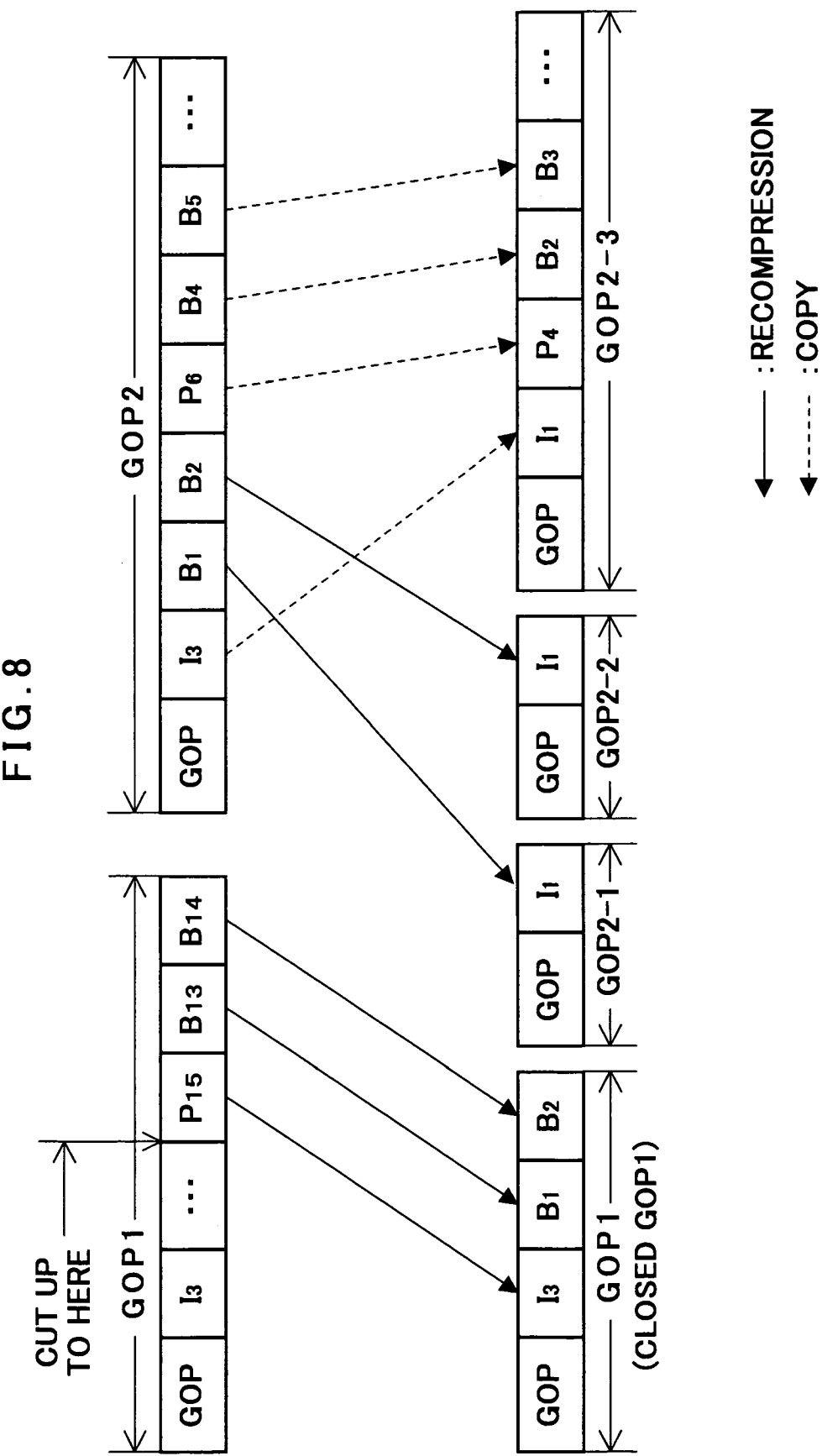

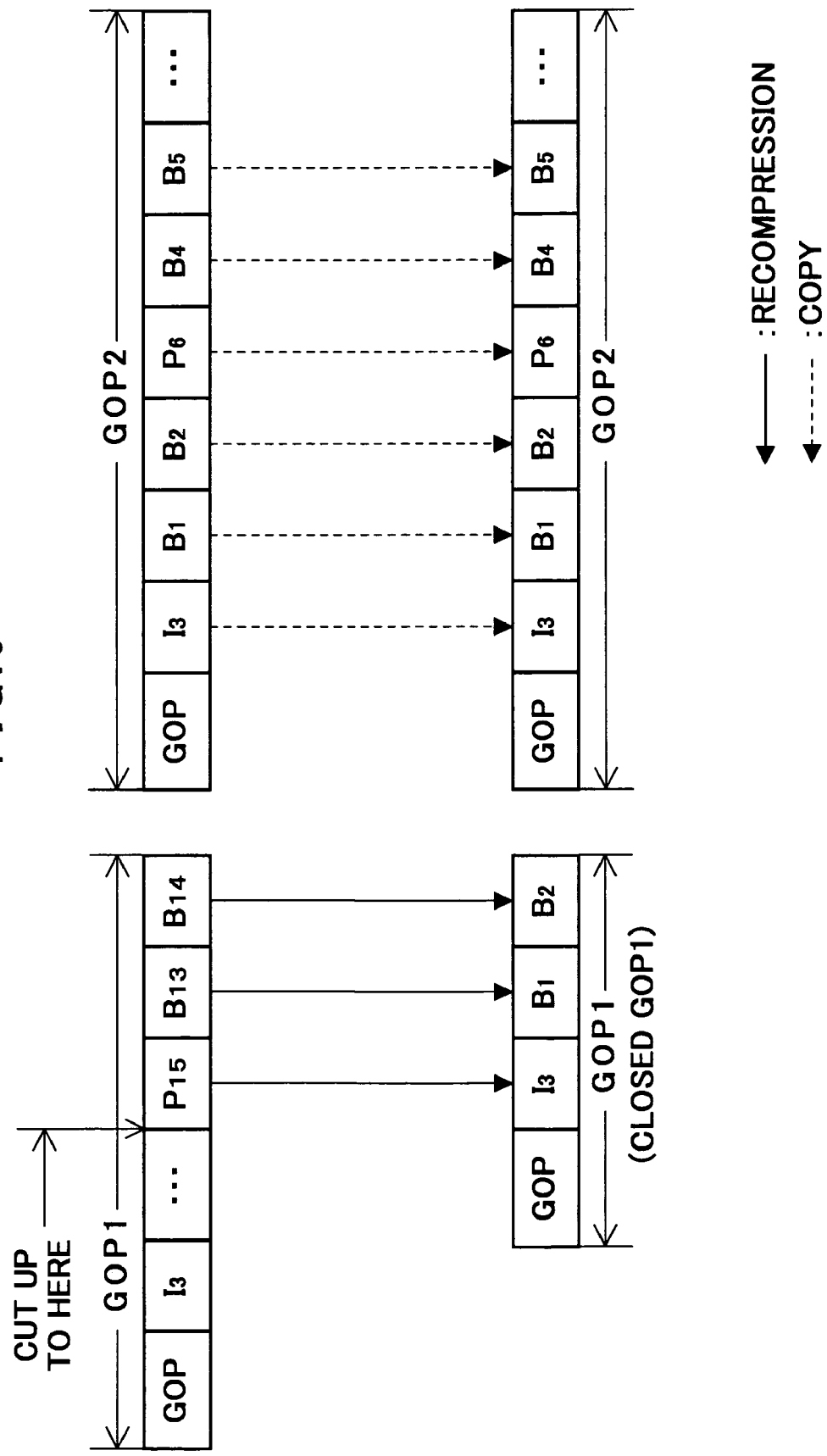

■ CASE1 : DELETE FRONT PORTION OF DATA

■ CASE2 : DELETE TAIL PORTION OF DATA

■ CASE3 : DELETE MIDDLE PORTION OF DATA

■ CASE4 : DELETE FRONT AND TAIL PORTIONS OF DATA

■ CASE5 : CONCATENATE DATA A AND DATA B

■ CASE6 : INSERT DATA B INTO DATA A

IMAGE EDITING APPARATUS AND IMAGE EDITING METHOD

BACKGROUND OF THE INVENTION

The present invention relates to an image editing apparatus and an image editing method for editing a video signal which is compressed by an image coding method such as MPEG (Moving Picture Experts Group) by which a plurality of image frames are compressed as a unit.

FIELD OF THE INVENTION

Description of the Related Art

A video signal is usually recorded in a compressed form in a recording medium such as an optical disk, a hard disk, a magnetic tape, and the like, because the data size of the video is considerably large. Various methods have been proposed as the compressing methods used to compress a video signal. Among the various methods, an MPEG method is the most famous, and is employed in various systems such as digital satellite broadcasting, a DVD, and the like.

According to the MPEG method, compression is performed by the unit of a GOP (Group of Pictures) which is made of a plurality of frames. FIG. 2 shows an example of a GOP. As shown in FIG. 2, a GOP is structured by combining an I picture (an abbreviated name of an image compressed by intra-frame coding), a P picture (an abbreviated name of an image compressed by inter-frame mono-directional predictive coding), and a B picture (an abbreviated name of an image compressed by inter-frame dual-directional predictive coding). Such a combined structure is usually called "frame structure".

An I picture is a frame which is coded (compressed) based only on the data of the picture itself, and can be expanded without referring to another frame. A P picture is a frame which is compressed by performing inter-frame mono-directional prediction based on a past frame, and coding a difference. When a P picture is decoded (expanded), it refers to an I picture or a P picture which is expanded immediately before the P picture. An I picture and a P picture are frames referred to when the following frames are expanded. A B picture is a frame which is compressed by performing inter-frame dual-directional prediction based on a past frame and a future frame, and coding differences. Since a B picture needs a future frame for prediction, a future frame to be used for prediction is coded before the B picture itself is coded. Therefore, when coding frames, the arrangement of the frames should be changed. The arrangement of the frames is changed, and the frames are coded. Thus obtained bit stream is decoded, and the recovered frames are rearranged into the original order. Accordingly, in order to expand a B picture, one to two I pictures or a P picture expanded immediately before the B picture are used as reference frames. The B picture is not referred to when frames following the B picture are expanded. The numeral described at the lower right portion of each I picture, P picture, or B picture represents the order to display the picture in a GOP.

A GOP is usually made of about 15 frames which represent data of approximately 0.5 second. The head frame of a GOP must be an I picture in the bit stream obtained by coding.

In order to edit MPEG video with high precision, it is necessary to edit the video by the unit of one frame. However, an I picture or a P picture is necessary for expanding a P picture or a B picture, as described above. Therefore, MPEG video data editing has conventionally been performed by the unit of a GOP.

Accordingly, it has been difficult to perform highly precise editing by the unit of one frame, according to a conventional MPEG video data editing method.

A method by which MPEG video is created by expanding original MPEG video and recompressing the video is known as an editing method by the unit of one frame.

However, since an MPEG method is a lossy coding method, the above editing method entails problems such as that image quality is deteriorated as compression and expansion are repeated, and that temporal efficiency is poor since many frames are necessary for compression and expansion.

To solve those problems, Unexamined Japanese Patent Application KOKAI Publication No. H11-112980 discloses a signal editing apparatus and method which expand and recompress only pictures included in a GOP to be edited, instead of expanding and recompressing the whole MPEG data.

In case of concatenating two image data, the signal editing apparatus disclosed in Unexamined Japanese Patent Application KOKAI Publication No. H11-112980 re-codes the concatenating portion of a GOP which is arranged at the head of the latter data of the two data and all the pictures that are arranged after the concatenating portion. At that time, the last P picture included in the re-coded head GOP becomes different from the original last P picture. Thus, in a case where the next GOP is not a closed GOP, a B picture arranged near the head portion of the next GOP cannot be decoded, and a "broken link" flag stands for the next GOP.

Unexamined Japanese Patent Application KOKAI Publication No. H11-187410 discloses an editing method which, instead of expanding and recompressing the whole MPEG video data, recompresses a picture which is arranged at a portion from which the data to be edited is cut out into an I picture, and rearranges the following pictures into the reproducing order by some processes such as deleting pictures according to picture types, so that the temporal reference is changed.

According to this method, there are not many pictures which are to be recompressed after being expanded. Therefore, chances of deteriorating the image quality can be reduced. And since the number of frames necessary for expansion and compression is small, temporal efficiency is very high.

However, even if the picture (I picture or P picture) arranged at the cutting portion is recompressed into an I picture, a P picture appearing after this picture is data which has been compressed based on that it will be expanded by referring to the I picture or P picture before recompression. Therefore, the P picture appearing after the picture arranged at the cutting portion cannot properly be expanded by referring to the I picture created by recompression, and thus the image quality is deteriorated. The deterioration of the image quality affects all the pictures appearing after the P picture until an I picture of the next GOP is expanded.

As described above, conventional MPEG video data editing methods have the following problems.

First, in case of concatenating two image data, a B picture arranged near the head portion of a GOP which appears immediately after a GOP arranged at the head of the latter data of the two image data cannot be decoded, and thus a "broken link" flag stands for the GOP second to the head GOP.

This is because when the picture arranged at the concatenating portion of the head GOP of the latter data and all the pictures following this picture are recompressed, the last P picture included in the head GOP becomes different from the original last P picture.

Second, in a case where the data to be edited is cut out from the whole MPEG video data from a picture arranged in the middle of a GOP, this GOP cannot properly be expanded.

This is because a P picture and a B picture in a GOP refer to an I picture or a P picture which has not been recompressed into an I picture.

SUMMARY OF THE INVENTION

The present invention was made in view of the above-described problems of the prior art, and it is an object of the present invention to provide an image editing apparatus and an image editing method which are capable of processing any types of frame structure of GOPs and properly expanding pictures when editing video data such as MPEG video data, and which are capable of performing editing by the unit of one frame of the video data.

To accomplish the above object, an image editing apparatus according to a first aspect of the present invention is an image editing apparatus which edits image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame and coding a difference obtained by the prediction, and a third type image frame which is created by performing inter-frame dual-directional prediction based on a past image frame and a future image frame and coding differences obtained by the prediction, and the plurality of image frames are coded so that a head frame of each group may be the first type image frame, the apparatus comprising:

an image coder which codes each of frames of image data into one of the first type image frame, the second type image frame, and the third type image frame;

an image decoder which decodes the image frame coded by the image coder; and an image data analyzer which determines types of image frames included in each group, wherein: the image data analyzer determines whether or not a head group which is arranged at a head of an editing target area included in the image data is a closed group which does not include the third type image frame which is to be decoded by referring to an image frame included in a group which is arranged before the head group; and in a case where the image data analyzer determines that the head group is not the closed group, the image coder converts a portion near the head of the editing target area into the closed group.

The image data analyzer determines whether or not the third type image frame included in the head group is an image frame which is to be decoded by referring to an image frame included in a group which is arranged before the head group.

In a case where the image data analyzer determines that the third type image frame is to be decoded by referring to an image frame included in the group arranged before the head group, the image decoder decodes the third type image frame.

The image coder codes the third type image frame which is determined by the image data analyzer as an image frame to be decoded by referring to an image frame included in the group arranged before the head group, and is decoded by the image decoder, into an image frame which is able to be decoded without referring to an image frame included in the group arranged before the head group.

To accomplish the above object, an image editing apparatus according to a second aspect of the present invention is an image editing apparatus which edits image data which has been coded in accordance with an MPEG method, the apparatus comprising:

image data analyzing means for analyzing a structure of image frames included in each GOP of the image data, and determining an attribute of each GOP and picture types of image frames included in each GOP;

conversion point detecting means for detecting a GOP which needs to be re-coded from an editing target area of the image data, and an image frame which needs to be recoded from the detected GOP;

image decoding means for decoding the image frame which needs to be re-coded detected by the conversion point detecting means;

GOP converting means for creating a new GOP by recoding the image frame decoded by the image expanding means; and image data concatenating means for concatenating a plurality of image data which are cut out as editing target areas, wherein: the image data analyzing means determines whether or not a head GOP which is arranged at a head of the editing target area is a closed GOP; and in a case where the image data analyzing means determines that the head GOP of the editing target area is not a closed GOP, the GOP converting means converts a portion near the head of the editing target area into a closed GOP.

To accomplish the above object, an image editing apparatus according to a third aspect of the present invention is an image editing apparatus which edits image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, the apparatus comprising:

an image encoder which codes each of frames of image data into one of the first type image frame, the second type image frame, and the third type image frame in accordance with the image coding method;

an image decoder which decodes the image frame coded by the image encoder; and an image data analyzer which determines types of image frames included in each group, wherein: in a case where the image data analyzer determines that a head image frame which is arranged at a head of an editing target area included in the image data is not the first type image frame, the image decoder decodes the head image frame, and each image frame appearing between the head image frame and the first type image frame which appears first after the head image frame; and the image encoder re-codes the image frames which are created by decoding the head image frame and each image frame appearing between the head image frame and the first type image frame which appears first after the head image frame, and re-codes the head image frame into the first type image frame, and re-codes any of the third type image frame appearing after the head image frame into an image frame which is able to be decoded without referring to an image frame arranged before the head image frame.

In a case where the image data analyzer determines that the head image frame of the editing target area is not the first type image frame, the image decoder decodes any of the third type image frame that appears after the first type image frame which appears first after the head image frame if any of the third type image frame is an image frame which is to be decoded by referring to an image frame which is arranged before the first type image frame.

The image encoder re-codes the image frame which is created by decoding any of the third type image frame that appears after the first type image frame which appears first after the head image frame.

Further, when the image encoder re-codes the image frames which are created by decoding each frame appearing between the head image frame and the first type image frame which appears first after the head image frame, the image encoder re-codes any of the third type image frame that appears after the head image frame into the third type image frame that is able to be decoded without referring to an image frame which is arranged before the head image frame.

In a case where the image data analyzer determines that the head image frame of the editing target area is the first type image frame, the image decoder decodes any of the third type image frame that appears after the head image frame.

The image encoder re-codes the image frame which is created by decoding any of the third type image frame that appears after the head image frame into an image frame which is able to be decoded without referring to an image frame which is arranged before the head image frame.

In a case where the image data analyzer determines that the head image frame of the editing target area is the first type image frame, the image decoder decodes any of the third type image frame that appears after the head image frame.

The image encoder re-codes the image frame which is created by decoding any of the third type image frame that appears after the head image frame into the first type image frame.

In a case where the image data analyzer determines that the head image frame of the editing target area is the first type image frame, the image decoder may decode any of the third type image frame that appears after the head image frame.

The image encoder may re-code the image frame which is created by decoding any of the third type image frame that appears after the head image frame into the third type image frame which is able to be decoded without referring to an image frame which is arranged before the head image frame.

To accomplish the above object, an image editing apparatus according to a fourth aspect of the present invention is an image editing apparatus which edits image data which has been coded in accordance with an image coding methods wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, the apparatus comprising:

an image encoder which codes each of frames of image data into one of the first type image frame, the second type image frame, and the third type image frame in accordance with the image coding method;

an image decoder which decodes the image frame coded by the image encoder; and an image data analyzer which determines types of image frames included in each group, wherein: the image data analyzer determines whether a first condition that the first type image frame which appears first in an editing target area included in the image data coded in accordance with the image coding method is a head image frame which is arranged at a head of a group, and a second condition that the group is a closed group which does not include the third type image frame which is to be decoded by referring to an image frame included in a group which is arranged before the group are satisfied or not;

in accordance with a result of determining the first condition and the second condition, the image decoder decodes any of the third type image frame that appears after the first type image frame appearing first in the editing target area and that needs to be recoded; and the image encoder re-codes the image frame which is created by decoding any of the third type image frame that appears after the first type image frame which appears first in the editing target area.

Further, in a case where the image data analyzer determines that one of the first condition and the second condition is not satisfied, the image decoder decodes any of the third type image frame that appears after the first type image frame which appears first in the editing target area.

The image encoder re-codes the image data which is created by decoding any of the third type image frame that appears after the first type image frame which appears first in the editing target area.

In a case where the image data analyzer determines that the first condition is satisfied and the second condition is not satisfied, the image encoder recodes the image frame which is created by decoding any of the third type image frame that appears after the first type image frame which appears first in the editing target area into the first type image frame.

In a case where the image data analyzer determines that the first condition is satisfied and the second condition is not satisfied, the image encoder re-codes the image frame which is created by decoding any of the third type image frame that appears after the first type image frame which appears first in the editing target area into the third type image frame which is able to be decoded without referring to an image frame which is arranged before the head image frame.

In a case where the image data analyzer determines that the first condition and the second condition are satisfied, the image editing apparatus copies the image frame which is created by decoding any of the third type image frame that appears after the first type image frame which appears first in the editing target area to the image data after being edited.

To accomplish the above object, an image editing method according to a fifth aspect of the present invention is an image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the plurality of image frames are coded so that a head frame of each group may be the first type image frame, the image editing method comprising:

setting an editing target area in the image data which has been coded in accordance with the image coding method;

determining whether a head group which is arranged at a head of the editing target area is a closed group which does not include the third type image frame which is to be decoded by referring to an image frame included in a group which is arranged before the head group; and converting a portion near the head of the editing target area into the closed group in a case where the determining determines that the head group is not the closed group.

The image editing method according to the fifth aspect of the present invention further comprises:

determining whether any of the third type image frame included in the head group of the editing target area is an image frame which is to be decoded by referring to an image frame included in a group which is arranged before the head group;

decoding any of the third type image frame determined as an image frame which is to be decoded by referring to an image frame included in a group which is arranged before the head group; and coding any of the decoded third type image frame into an image frame which is able to be decoded without referring to an image frame included in a group which is arranged before the head group.

To accomplish the above object, an image editing method according to a sixth aspect of the present invention is an image editing method for editing image data which has been coded in accordance with an MPEG method, the image editing method comprising:

setting one or more editing target areas in the coded image data;

determining whether a head GOP which is arranged at a head of each of the one or more editing target areas is a closed GOP;

determining a picture type of a head image frame which is arranged at the head of each editing target area;

detecting a GOP which needs to be re-coded, and an image frame which is included in the GOP and needs to be re-coded in accordance with a result of the determining whether a head GOP of each editing target area is a closed GOP, and a result of the determining a picture type of a head image frame of each editing target area; and re-coding the detected image frame which needs to be re-coded, after it is decoded.

The image editing method according to the sixth aspect of the present invention further comprises:

determining a picture type of a next image frame which is arranged next to the head image frame of each editing target area, in a case where the determining whether a head GOP is a closed GOP determines that the head GOP of each editing target area is not a closed GOP;

decoding the next image frame and following image frames which are B pictures, in a case where the determining a picture type of a next image frame determines that the next image frame is a B picture, after decoding an image frame which is an I picture which is encountered first when going back in a reverse direction from the head image frame, each image frame between the encountered image frame and the head image frame, and the head image frame;

re-coding each decoded image frame, and re-coding the image frames which are created by decoding the following image frames which are B pictures into image frames which are able to be decoded without referring to an image frame which is arranged before the head image frame; and recording each of the image frames which are created by re-coding the head image frame and the following image frames which are B pictures after those image frame are decoded.

The image editing method according to the sixth aspect of the present invention further comprises:

decoding the head image frame of each editing target area in a case where the determining a picture type of a head image frame determines that the head image frame is a P picture, and also decoding each image frame appearing after the head image frame and before an image frame which is an I picture which appears first after the head image frame; and re-coding the image frames which are created by decoding the head image frame and each image frame appearing after the head image frame, and recoding the image frame which is created by decoding the head image frame into an image frame which is an I picture.

To accomplish the above object, an image editing method according to a seventh aspect of the present invention is an image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-flame mono-directional prediction based on a past image frame, and a third type image frame which is created by performing inter-frame dual-directional prediction based on a past image frame and a future image frame, and the image data is coded so that a head frame of each group may be the first type image frame, the image editing method comprising:

setting an editing target area in the image data which has been coded in accordance with the image coding method;

determining a type of a head image frame which is arranged at a head of the editing target area;

decoding the head image frame of the editing target area and each image frame appearing between the head image frame and the first type image frame which appears first after the head image frame, in a case where the determining a type determines that the head image frame is not the first type image frame; and re-coding the image frames created by decoding the head image frame and each image frame appearing between the head image frame and the first type image frame which appears first after the head image frame, and re-coding the head image frame into the first type image frame, and re-coding any of the third type image frame that appears after the head image frame into an image frame which is able to be decoded without referring to an image frame which is arranged before the head image frame.

The image editing method according to the seventh aspect of the present invention further comprises:

decoding any of the third type image frame that appears after the first type image frame which appears first after the head image frame if any of the third type image frame is an image frame which is to be decoded by referring to an image frame which is arranged before the first type image frame, in a case where the determining a type determines that the head image frame of the editing target area is not the first type image frame; and re-coding the image frame which is created by decoding any of the third type image frame that appears after the first type image frame which appears first after the head image frame.

The image editing method according to the seventh aspect of the present invention further comprises re-coding the image frames created by decoding the head image frame and each image frame appearing between the head image frame and the first type image frame which appears first after the head image frame, and re-coding any of the third type image frame that appears after the head image frame into the third type image frame which is able to be decoded without referring to an image frame which is arranged before the head image frame.

The image editing method according to the seventh aspect of the present invention further comprises:

decoding any of the third type image frame that appears after the head image frame of the editing target area in a case where the determining a type determines that the head image frame is the first type image frame; and re-coding the image frame which is created by decoding any of the third type image frame that appears after the head image frame into an image frame which is able to be decoded without referring to an image frame which is arranged before the head image frame.

The image editing method according to the seventh aspect of the present invention further comprises:

decoding any of the third type image frame that appears after the head image frame of the editing target area in a case where the determining a type determines that the head image frame is the first type image frame; and re-coding the image frame which is created by decoding any of the third type image frame that appears after the head image frame into the first type image frame.

The image editing method according to the seventh aspect of the present invention further comprises:

decoding any of the third type image frame that appears after the head image frame of the editing target area in a case where the determining a type determines that the head image frame is the first type image frame; and re-coding the image frame which is created by decoding any of the third type image frame that appears after the head image frame into the third type image frame which is able to be decoded without referring to an image frame which is arranged before the head image frame.

To accomplish the above object, an image editing method according to an eighth aspect of the present invention is an image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, the image editing method comprising:

setting an editing target area in the image data which has been coded in accordance with the image coding method;

determining whether a first condition that the first type image frame which appears first in the editing target area is a head image frame which is arranged at a head of a group and a second condition that the group is a closed group which does not include the third type image frame which is to be decoded by referring to an image frame included in a group which is arranged before the group are satisfied or not;

decoding any of the third type image frame that appears after the first type image frame which appears first in the editing target area and that needs to be re-coded, in accordance with a result of determining the first condition and the second condition; and re-coding the image frame which is created by decoding any of the third type image frame that appears after the first type image frame which appears first in the editing target area.

The image editing method according to the eighth aspect of the present invention further comprises:

decoding any of the third type image frame that appears after the first type image frame which appears first in the editing target area, in a case where the determining determines that one of the first condition and the second condition is not satisfied; and recoding the image frame which is created by decoding any of the third type image frame that appears after the first type image frame which appears first in the editing target area.

The image editing method according to the eighth aspect of the present invention further comprises re-coding the image frame which is created by decoding any of the third type image frame that appears after the first type image frame which appears first in the editing target area into the first type image frame, in a case where the determining determines that the first condition is satisfied, and the second condition is not satisfied.

The image editing method according to the eighth aspect of the present invention further comprises re-coding the image frame which is created by decoding any of the third type image frame that appears after the first type image frame which appears first in the editing target area into the third type image frame which is able to be decoded without referring to an image frame which is arranged before the head image frame, in a case where the determining determines that the first condition is satisfied, and the second condition is not satisfied.

The image editing method according to the eighth aspect of the present invention further comprises copying the image frame which is created by decoding any of the third type image frame that appears after the first type image frame which appears first in the editing target area to the image data after being edited, in a case where the determining determines that the first condition and the second condition are satisfied.

The image editing method according to the eighth aspect of the present invention further comprises inserting a first or second type image frame which appears immediately before a head image frame which is arranged at the head of the editing target area into the head of the editing target area, in a case where the head image frame is the third type image frame.

In the image editing apparatuses according to the first, third, and fourth aspects, and in the image editing methods according to the fifth, seventh, and eighth aspects of the present invention, the image coding method is an MPEG method, each of the groups is a GOP of MPEG, the first type image frame is an I picture, the second type image frame is a P picture, and the third type image frame is a B picture, for example.

BRIEF DESCRIPTION OF THE DRAWINGS

These objects and other objects and advantages of the present invention will become more apparent upon reading of the following detailed description and the accompanying drawings in which:

FIG. 2 is a diagram showing a structure of a GOP;

FIGS. 3A and 3B are diagrams showing concepts of frame reference in either a closed GOP or a non-closed GOP;

FIG. 7, FIG. 8, and FIG. 9 are concept diagrams showing examples of MPEG video data editing schemes performed by the MPEG video editing apparatus according to one embodiment of the present invention;

DETAILED DESCRIPTION OF THE PREFERRED EMBODIMENTS

An MPEG video editing apparatus according to one embodiment of the present invention will now be explained below with reference to the drawings.

Figure 1:
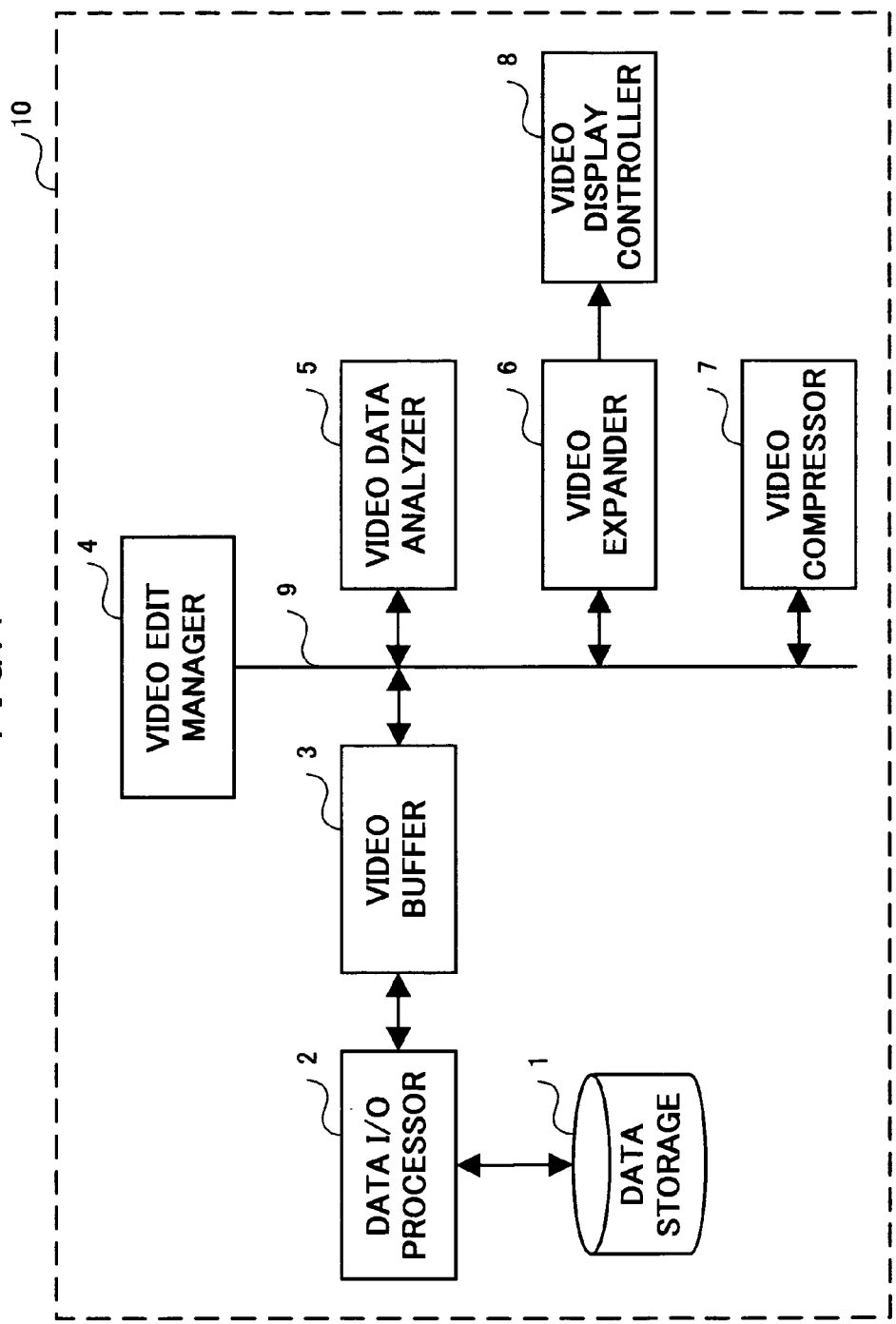
FIG. 1 is a block diagram showing a structure of an MPEG video editing apparatus according to one embodiment of the present invention.

FIG. 1 is a block diagram showing a structure of an MPEG video editing apparatus 10 according to this embodiment.

As shown in FIG. 1, the MPEG video editing apparatus 10 according to this embodiment comprises a data storage 1 which stores MPEG video data, a data I/O processor 2 which reads unedited MPEG video data from the data storage 1, or writes edited MPEG video data into the data storage 1, a video buffer 3 which stores MPEG video data read out by the data I/O processor 2 or MPEG video data being edited, a video edit manager 4 which controls editing processes for MPEG video data, a video data analyzer 5 which analyzes attribute information of MPEG video data such as GOP header information and picture header information, a video expander 6 which performs an expanding (decoding) process for MPEG video data, a video compressor 7 which performs a compressing (coding) process for video data including expanded MPEG video data, and a video display controller 8 which controls display of expanded MPEG video data.

The data storage 1 is constituted by a storage device such as a hard disk device or the like. The data I/O processor 2 is constituted by a logic circuit such as an ASIC (Application Specific Integrated Circuit) for controlling the storage device constituting the data storage 1, or an application specific processor or a general purpose processor which employs such a logic circuit. The video buffer 3 is constituted by a semiconductor memory such as a DRAM, a memory whose application is specific to video data processing, or the like. The video edit manager 4 is constituted by a logic circuit such as an ASIC for exclusive use of a video editing apparatus, or an application specific processor or a general purpose processor which employs such a logic circuit. The video data analyzer 5, the video expander 6, and the video compressor 7 are constituted respectively by logic circuits such as ASICs which are suitable for the respective purposes, or application specific processors or general purpose processors which employ such logic circuits. The video display controller 8 is constituted by a logic circuit such as an ASIC for controlling a non-illustrated display device such as a CRT display device or a liquid crystal display device, or an application specific processor or a general purpose processor which employs such a logic circuit. In a case where each of the data I/O processor 2, the video edit manager 4, the video data analyzer 5, a video expander 6, the video compressor 7, and the video display controller 8 is constituted by a processor, the processor executes a program stored in a non-illustrated ROM or RAM to realize its function. Each of the data I/O processor 2, the video edit manager 4, the video data analyzer 5, the video expander 6, the video compressor 7, and the video display controller 8 may be constituted by a combination of a circuit for its own use and a processor, and may realize its function by a program by which one part of the function is realized by the circuit, and the other part of the function is realized by the processor. Further, processors of all or part of the data I/O processor 2, the video edit manager 4, the video data analyzer 5, the video expander 6, the video compressor 7, and the video display controller 8 may be integrated into one processor, and respective functions may be realized by a program to be executed by the processor. For example, the data I/O processor 2 and the video display controller 8 may be constituted by an I/O adapter which controls the data storage 1, and a display control adapter which controls the display device, respectively. And the video edit manager 4, the video data analyzer 5, the video expander 6, and the video compressor 7 may be constituted by a single processor and a memory such as a ROM, a RAM, or the like, and the respective functions may be realized by a program to be executed by the processor. The video expander 6 and the video compressor 7 may be constituted by a CODEC (coder-decoder) for MPEG.

As shown in FIG. 1, the video buffer 3, the video edit manager 4, the video data analyzer 5, the video expander 6, and the video compressor 7 are mutually connected via a connection path 9 such as a bus. The data I/O processor 2 and the video display controller 8 are connected to the connection path 9 via the video buffer 3 and the video expander 6 respectively. The data I/O processor 2 and the video display controller 8 may be directly connected to the connection path 9 respectively. Other than a bus, an arbitrary connection path may be employable, such as a switch fabric or the like. Further, in a case where the video edit manager 4, the video data analyzer 5, and the like are realized by a shared processor and programs to be executed by the processor instead of hardware such as circuits and processors independently prepared for the respective functions, connection between those functions may be realized by connecting the programs by software, instead of being realized by the connection path 9 realized by hardware.

Figure 4:
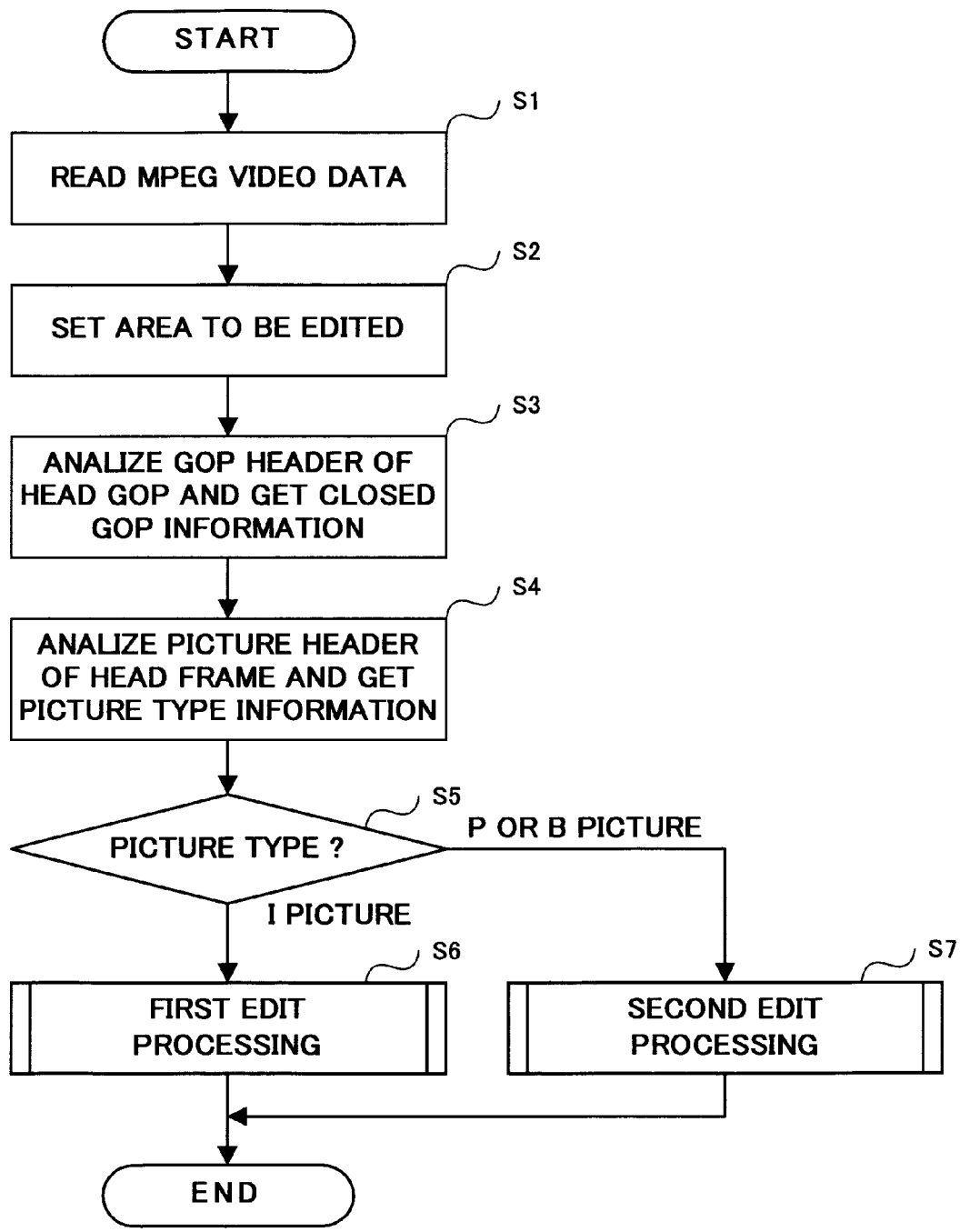
FIG. 4, FIG. 5, and FIGS. 6A and 6B are diagrams showing flowcharts for explaining processes performed by the MPEG video editing apparatus according to one embodiment of the present invention.

FIG. 4 is a flowchart showing a process performed by the MPEG video editing apparatus 10 according to this embodiment. With reference to FIG. 4, the process performed by the MPEG video editing apparatus 10 will be explained. In the following explanation, an I picture will appear only as a head frame of a GOP, and will not be arranged in the middle of a GOP.

First, the data I/O processor 2 reads MPEG video data to be edited from the data storage 1 to the video buffer 3 in accordance with an operation of a user who is editing MPEG video data (step S1).

The video edit manager 4 sets an area of the MPEG video data to be edited in accordance with an operation of the user (step S2). The user operates to designate the MPEG video data to be edited, and to set the area to be edited are performed by using a non-illustrated user interface. A method for setting the area to be edited is arbitrary, and is not limited in particular. For example, in order to set the area, a frame number may be designated, or a series of video data represented by frames may be displayed, so that an area may be selected from the displayed video data.

Then, the video data analyzer 5 analyzes a GOP header of a head GOP in the area to be edited, and gets closed GOP information representing that the GOP is/is not a closed GOP (step S3).

Further, the video data analyzer 5 analyzes a picture header of a head frame in the area to be edited, and gets information representing a picture type (step S4), and determines the picture type of the frame (step S5).

In a case where the picture type of the head frame is an I picture, the process flow goes to step S6 to execute a first editing routine (step S6). In a case where the picture type of the head frame is a P picture or a B picture, the process flow goes to step S7 to execute a second editing routine (step S7).

Figure 5:
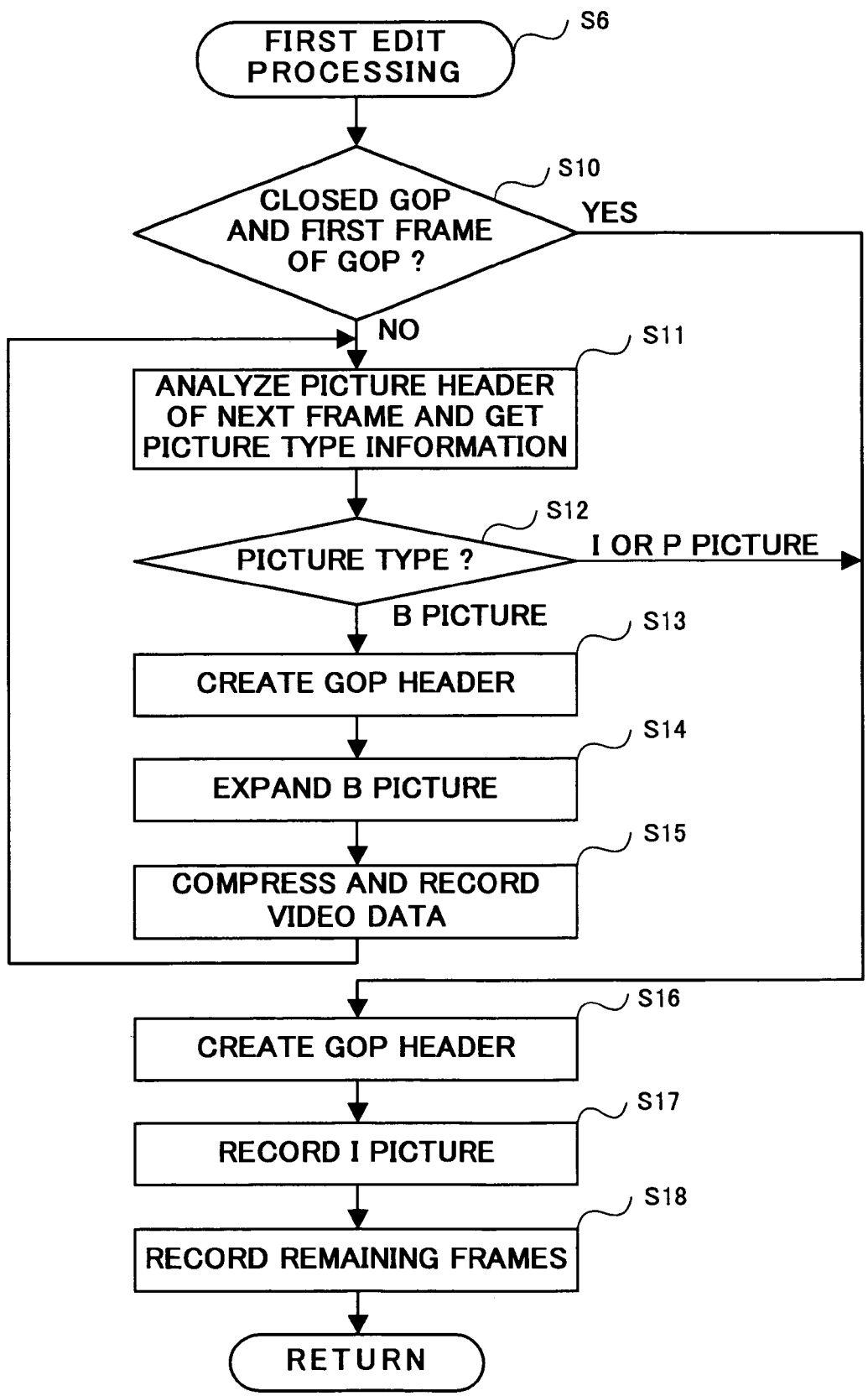

A process performed by the MPEG video editing apparatus 10 for executing the first editing routine (step S6) which is to be executed in a case where the head frame in the area to be edited is an I picture will be explained with reference to FIG. 5. FIG. 5 is a flowchart showing the process performed by the MPEG video editing apparatus 10 when executing the first editing routine.

The video data analyzer 5 analyzes the closed GOP information got in step S3, and determines whether or not the GOP is a closed GOP or not (step S10). In a case where determined as YES, that is, determined that the GOP is a closed GOP, the process flow goes to step S16.

In a case where determined as NO in step S10, that is, determined that the GOP is not a closed GOP, the process flow goes to step S11. In step S11, the video data analyzer 5 analyzes a picture header of a next frame, and gets information representing a picture type. Then, the video data analyzer 5 determines the picture type of the next frame (step S12). In a case where the next frame is determined as an I picture or a P picture, the process flow goes to step S16.

In a case where the next frame is determined as a B picture in step S12, the process flow goes to step S13. In step S13, the video edit manager 4 creates GOP header information, and records the created GOP header information in the data storage 1 via the data 10 processor 2.

Then, the video expander 6 expands the B picture (step S14). To expand the B picture requires a frame (hereinafter referred to as a first frame) which is the I picture that is arranged immediately before this B picture (the I picture detected in step S5), and a frame (hereinafter referred to as a second frame) which is either an I picture or a P picture that is encountered first when going back in a reverse direction from the first frame. In a case where the second frame is an I picture, the I picture requires no other frame in order to be expanded. However, in a case where the second frame is a P picture, it is necessary to sequentially expand an I picture which is encountered first when going back in a reverse direction from the second frame and the second frame which is the P picture. The second frame should be the last I picture or P picture included in a GOP which is arranged one ahead of this GOP. According to this embodiment, since an I picture is arranged only at the head of a GOP, it is necessary to sequentially expand an I picture which is arranged at the head of the GOP one ahead of this GOP, and the second frame which is a P picture.

Then, the video compressor 7 compresses the video data which has been expanded in step S14 into an I picture, and records the I picture in the data storage 1 via the data I/O processor 2 (step S15). After recording, the process flow returns to step S11 in order to process a next frame.

In a case where the GOP is determined as a closed GOP in step S10, and in a case where the next frame is determined as an I picture or a P picture in step S12, the process flow goes to step S16. In step S16, the video edit manager 4 creates GOP header information, and records the created GOP header information in the data storage I via the data I/O processor 2. Thereafter, the video edit manager 4 records the I picture detected in step S5 in the data storage 1 via the data I/O processor 2 (step S17).

Then, the video edit manager 4 records the remaining data from a next frame to the final frame in the area to be edited which is set in step S2 in the data storage 1 via the data I/O processor 2 (step S18).

Then, the first editing routine which is executed in a case where a head frame in the area to be edited is an I picture is terminated.

Figure 6A:
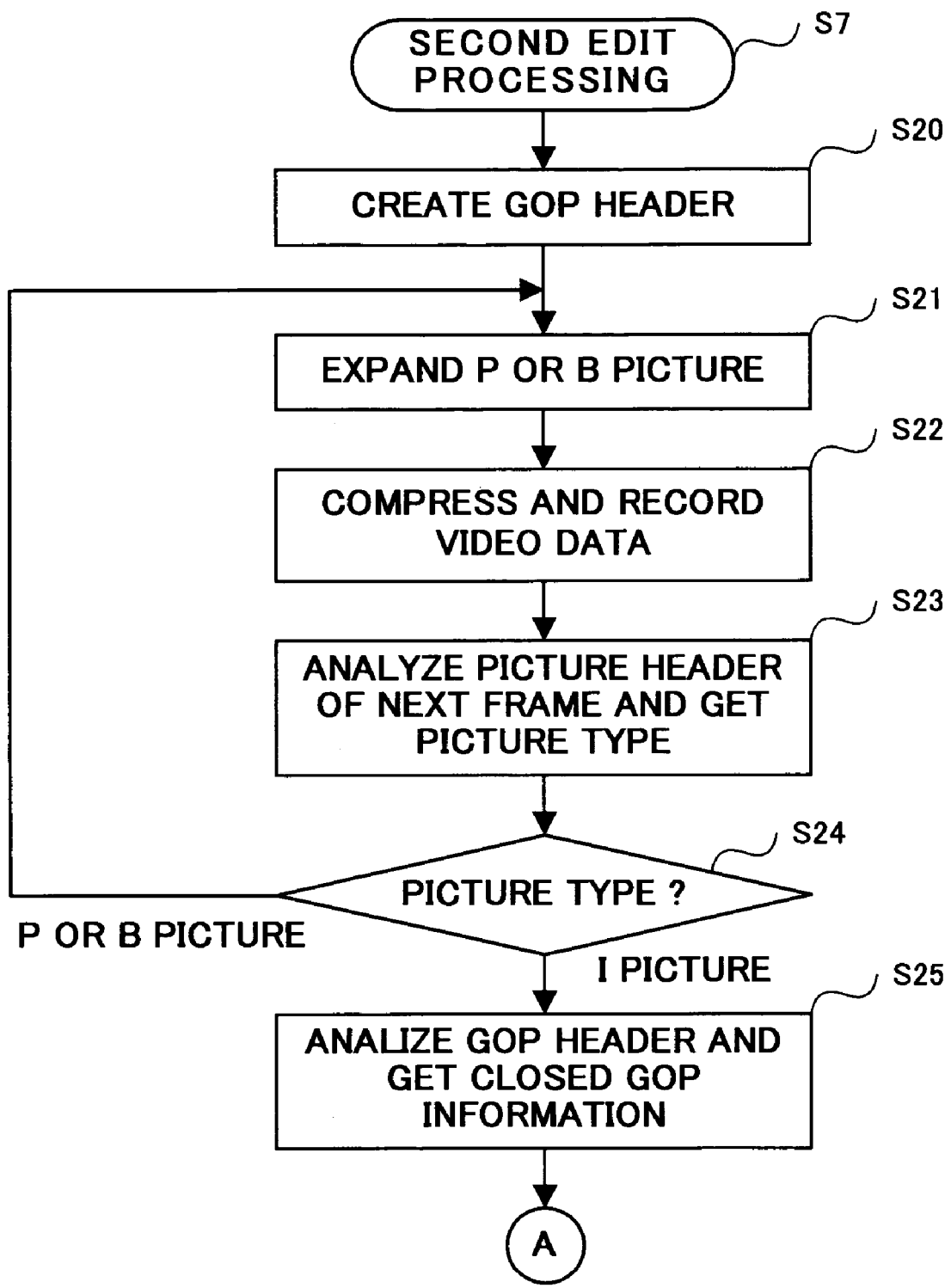
Figure 6B:
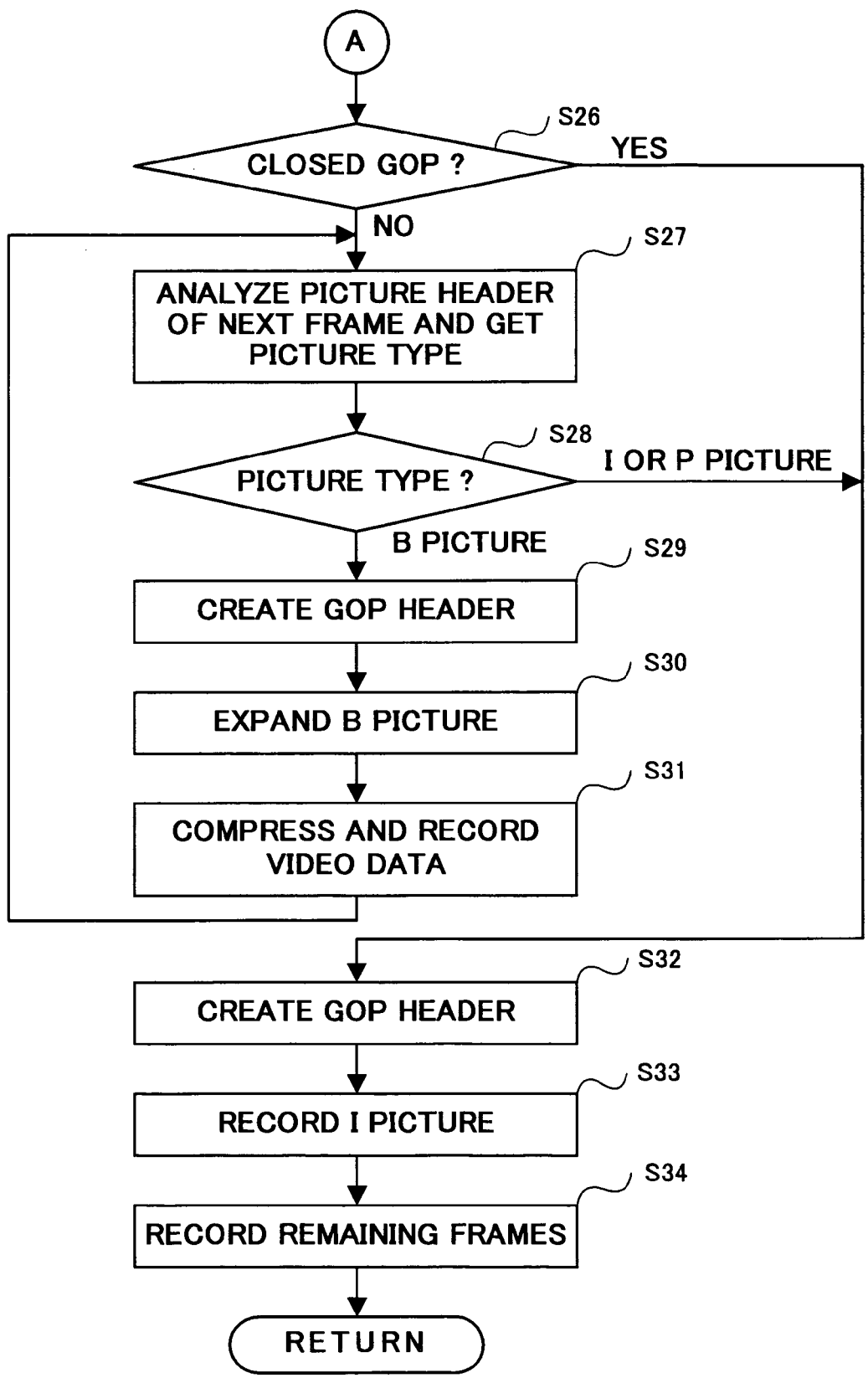

Next, a process performed by the MPEG video editing apparatus 10 when executing the second editing routine (step S7) which is to be executed in a case where the head frame in the area to be edited is a P picture or a B picture will be explained with reference to FIGS. 6A and 6B. FIGS. 6A and 6B show a flowchart showing the process performed by the MPEG video editing apparatus 10 when executing the second editing routine.

First, the video edit manager 4 creates GOP header information, and records the created GOP header information in the data storage 1 via the data I/O processor 2 (step S20). At this time, the video edit manager 4 sets information representing that a GOP to be edited is a closed GOP to the GOP header information.

The video expander 6 expands the P picture or the B picture which is the head frame (step S21).

In order to expand the P picture or the B picture, an I picture or a P picture which is arranged immediately before this P picture or B picture is necessary. Therefore, after an I picture at the head of a GOP to the I picture or the P picture which is arranged immediately before are sequentially expanded, the P picture or the B picture is expanded.

If the head frame in the area to be edited is a B picture sandwiched between an I picture and a P picture, and the GOP is not a closed GOP, it is necessary to firstly expand an I picture which is arranged at the head of a GOP one ahead, likewise in step S14.

Then, the video compressor 7 compresses video data created by expanding in step 821, and records a picture created by compressing in the data storage 1 via the data I/O processor 2 (step S22).

At this time, in a case where the picture to be created by compressing is a first picture, the video data is compressed into an I picture. And in a case where the picture to be created by compressing is a picture which is arranged second or thereafter, and also is a B picture, the video compressor 7 creates a B picture by referring to only a first picture which is compressed into an I picture, so that a to-be-newly-created GOP may become a closed GOP.

Then, the video data analyzer 5 analyzes a picture header of a next frame and gets a picture type (step S23), and determines the picture type (step S24). In a case where the next frame is a P picture or a B picture, the process flow returns to step S21.

In a case where the next frame is an I picture, the process flow goes to step 325. In this case, since an I picture will appear only as a head frame of a GOP in this embodiment, a GOP header exists immediately before the I picture. The video data analyzer 5 analyzes the GOP header, and gets closed GOP information (step S25).

Then, the video data analyzer 5 analyzes the closed GOP information got in step S25, and determines whether the GOP to be edited is a closed GOP or not (step S26).

In a case where the GOP to be edited is not a closed GOP, the process flow goes to step S27. In step S27, the video data analyzer 5 analyzes a picture header of a next frame and gets a picture type of the next frame. Then, the video data analyzer 5 determines the picture type (step S28). In a case where the next frame is determined as an I picture or a P picture, the process flow goes to step S32.

In a case where the next frame is determined as a B picture in step S28, the process flow goes to step S29. In step S29, the video edit manager 4 creates a GOP header information, and records the created GOP header information in the data storage 1 via the data 10 processor 2.

Then, the video expander 6 expands the B picture (step S30). In order to expand this B picture, a last I picture or a last P picture of a GOP which is arranged one ahead, and the I picture which is arranged immediately before this B picture are necessary. Therefore, after an I picture at the head of the GOP arranged one ahead, the last I picture or the last P picture, and the I picture arranged immediately before are sequentially expanded, this B picture is expanded.

The video compressor 7 compresses video data created by expanding in step S30 into an I picture, and records the I picture created by compressing in the data storage 1 via the data 10 processor 2 (step S31). After recording, the process flow returns to step S27 in order to process a next frame.

In a case where the GOP to be edited is determined as a closed GOP in step S26, and in a case where the next frame is determined as an I picture or a P picture in step S28, the process flow goes to step S32. In step S32, the video edit manager 4 creates GOP header information, and records the created GOP header information in the data storage 1 via the data I/O processor 2. After this, the video edit manager 4 records the I picture detected instep S24 in the data storage 1 via the data I/O processor 2 (step S33).

Then, the video edit manager 4 records the remaining data from a next picture to the final frame in the area to be edited which is set in step S2 in the data storage 1 via the data 1/O processor 2 (stepS34). In a case where the process flow goes from step S28 to step S32, the B picture which follows the I picture detected in step S24 is already stored in the data storage 1. Therefore, in step S34, the video edit manager 4 records data from the I picture or the P picture detected in step S28 to the final frame in the area to be edited set in step S2 in the data storage 1 via the data I/O processor.

Thus, the second editing routine which is executed in a case where the head frame in the area to be edited is a P picture or a B picture is terminated.

Next, specific examples of editing MPEG video data will be explained with reference to FIG. 7, FIG. 8, and FIG. 9.

Figure 7:
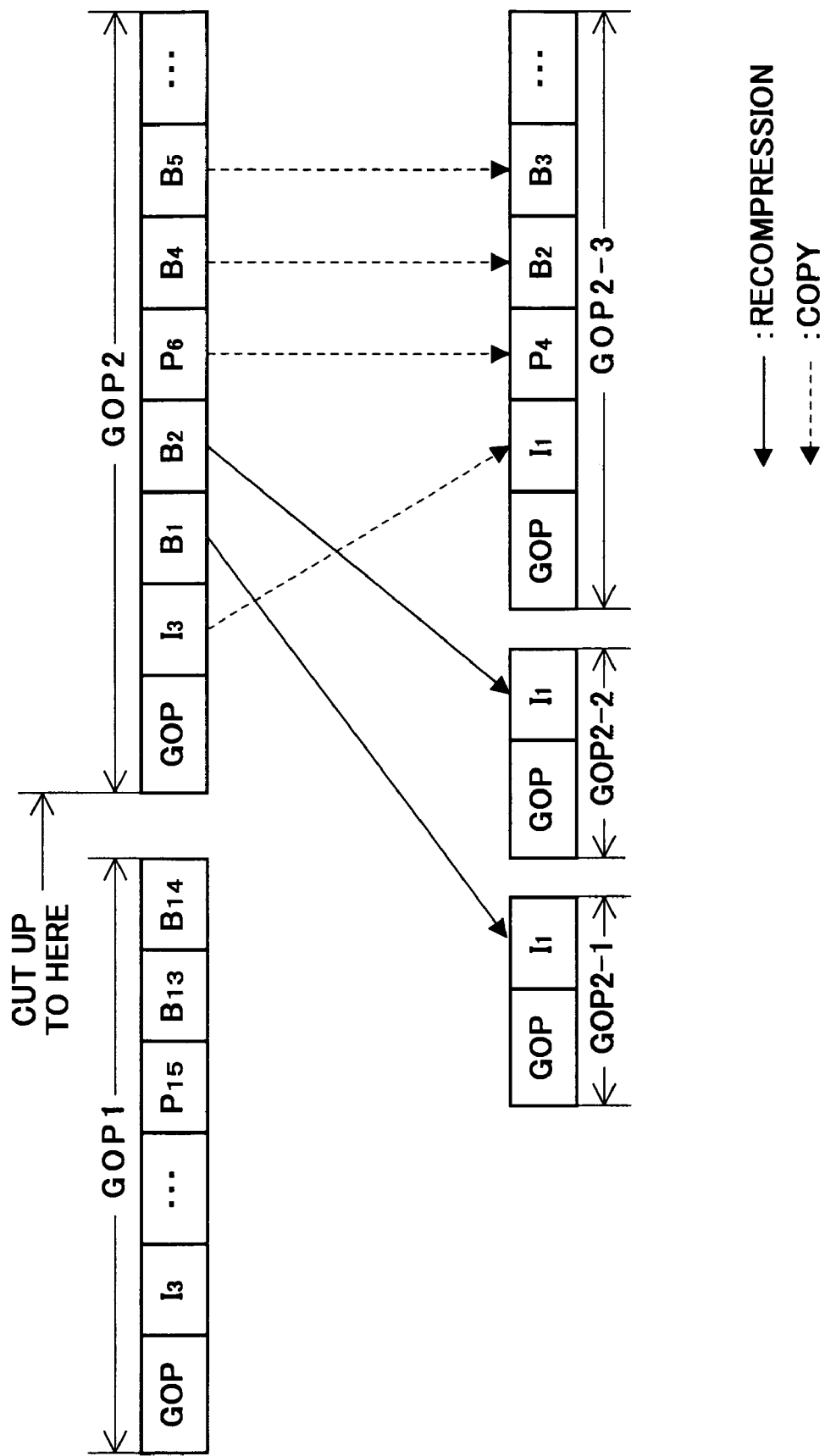

FIG. 7 is a concept diagram of an editing process for MPEG video data in a case where the head frame of the area to be edited is an I picture, and the head GOP (GOP 2) is not a closed GOP.

The video expander 6 expands B pictures $B_1$ and $B_2$ of the GOP 2 which are sandwiched between an I picture $I_3$ and a P picture $P_6$ by referring to a P picture $P_{15}$ of a GOP 1 and the I picture $I_3$ of the GOP 2. Therefore, in a case where the MPEG video data is cut at a frame before the I picture $I_3$ of the GOP 2, the video expander 6 cannot expand the B pictures $B_1$ and $B_2$ of the GOP 2.

Thus, when the B picture $B_1$ of the GOP2 is edited, the B picture $B_1$ is expanded by the video expander 6, compressed by the video compressor 7, and as a result, an I picture $I_1$ of a GOP2-1 is created.

Likewise the above, the B picture $B_2$ of the GOP 2 is edited and an I picture $I_1$ of a GOP 2-2 is created.

The video edit manager 4 copies the I picture $I_3$ of the GOP 2 and the P picture $P_6$ of the GOP 2 and frames after the P picture $P_6$ into a GOP 2-3.

The temporal references of the GOP 2-1, the GOP 2-2, and the GOP 2-3 are changed to orders indicated by indexes described at lower right portions of letters which represent the types of the pictures shown in FIG. 7.

FIG. 8 is a concept diagram of an editing process for MPEG video data in a case where the head frame of the area to be edited is a P picture, and a GOP (GOP 2) which appears first after the P picture is not a closed GOP.

The video expander 6 expands a P picture $P_{15}$ of a GOP 1 by referring to a P picture before the P picture $P_{15}$. The video expander 6 expands B pictures $B_{13}$ and $B_{14}$ of the GOP 1 by referring to the P picture $P_{15}$ and the P picture before the P picture $P_{15}$. Therefore, the video expander 6 expands pictures from an I picture $I_3$ of the GOP I to the P picture before the P picture $P_{15}$.

After the P picture $P_{15}$ of the GOP 1 is expanded by the video expander 6, it is compressed by the video compressor 7. As a result, a new I picture $I_3$ of a new GOP 1 is created.

After the B pictures $B_{13}$ and $B_{14}$ of the GOP 1 are expanded by the video expander 6, they are compressed by the video compressor 7. As a result, B pictures $B_1$ and $B_2$ of the new GOP 1 are created. At this time, the video compressor 7 creates B pictures $B_1$ and $B_2$ which can be expanded by referring only to the new I picture $I_3$ so that the new GOP 1 may become a closed GOP.

Since the GOP 2 is not a closed GOP, the video expander 6 expands B pictures $B_1$ and $B_2$ of the GOP 2 by referring to the P picture $P_{15}$ of the GOP 1 and an I picture $I_3$ of the GOP 2.

However, since the P picture $P_{15}$ of the GOP 1 becomes the I picture $I_3$ of the GOP 1 after editing, the P picture $P_{15}$ before editing cannot be referred to when expanding the B pictures $B_1$ and $B_2$ of the GOP 2. Thus, after the B picture $B_1$ of the GOP 2 is expanded by the video expander 6, it is compressed by the video compressor 7 and as a result, an I picture $I_1$ of a GOP 2-1 is created. The B picture $B_2$ of the GOP 2 is likewise edited and an I picture $I_1$ of a GOP 2-2 is created.

The video edit manager 4 copies the I picture $I_3$ of the GOP 2, a P picture $P_6$ of the GOP 2, and frames after the P picture $P_6$ into a GOP 2-3.

The temporal references of the GOP 1, the GOP 2-1, the GOP 2-2, and the GOP 2-3 are changed to orders indicated by indexes described at lower right portions of letters representing the types of pictures shown in FIG. 8.

FIG. 9 is a concept diagram of an editing process for MPEG video data in a case where the head frame of the area to be edited is a P picture, and a GOP (GOP 2) which appears first after the P picture is a closed GOP.

The video expander 6 expands a P picture $P_{15}$ of a GOP 1 by referring to a P picture before the P picture $P_{15}$. The video expander 6 expands B pictures $B_{13}$ and $B_{14}$ of the GOP 1 by referring to the P picture $P_{15}$ and the P picture before the P picture $P_{15}$. Therefore, the video expander 6 expands pictures from an I picture $I_3$ of the GOP 1 to the P picture before the P picture $P_{15}$.

After the P picture $P_{15}$ of the GOP 1 is expanded by the video expander 6, it is compressed by the video compressor 7. As a result, a new I picture $I_3$ of a new GOP 1 is created.

After the B pictures $B_{13}$ and $B_{14}$ of the GOP 1 are expanded by the video expander 6, they are compressed by the video compressor 7. As a result, B pictures $B_1$ and $B_2$ of the GOP 1 after editing are created.

Since the GOP 2 is a closed GOP, the video expander 6 expands B pictures $B_1$ and $B_2$ of the GOP 2 by referring only to an I picture $I_3$ of the GOP 2. Therefore, the video edit manager 4 copies the I picture $I_3$ of the GOP 2 and frames after the I picture $I_3$ to a GOP 2 after editing.

The temporal reference of the GOP 1 is changed into an order indicated by indexes described at lower right portions of letters representing the types of pictures shown in FIG. 9.

FIGS. 10A to 10F are schematic diagrams showing basic patterns of editing MPEG video data. By combining the basic patterns, any types of MPEG video data can be edited.

When editing MPEG video data, in a case where non-closed GOPs are concatenated as described above, a B picture between a head I picture and a next I picture or a P picture cannot properly use a reference frame. Therefore, the editing process cannot be performed properly. Thus, according to the present invention, the non-closed GOPs are converted into closed GOPs in order to be edited, as explained above.

Figure 10A:
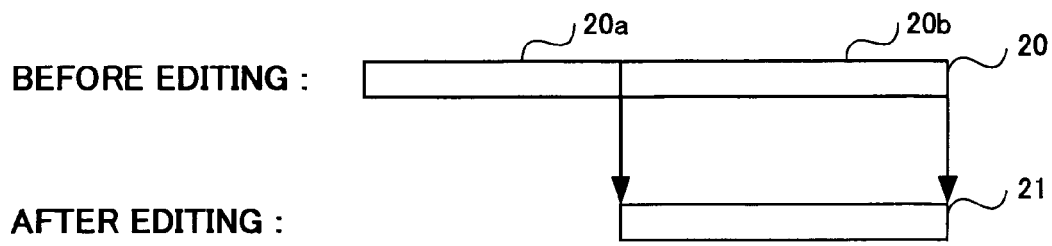
FIGS. 10A to 10F are concept diagrams showing basic patterns for editing MPEG video data.

FIG. 10A shows a case where a front portion 20a of original data 20 is deleted. In this case, a portion near the head of a tail portion 20b of the original data 20 is converted into a closed GOP, or a GOP which does not include a B picture to create data 21 after editing.

Figure 10B:
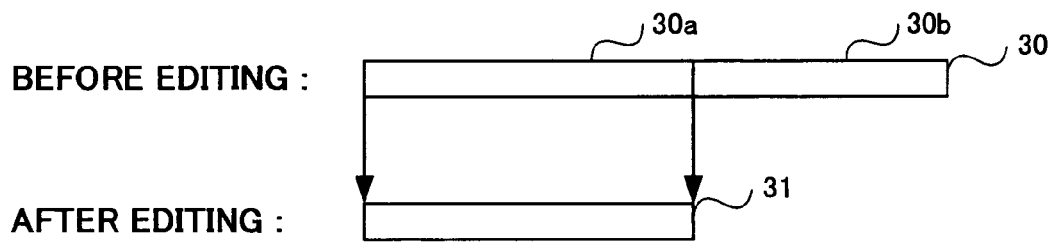

FIG. 10B shows a case where a tail portion 30b of original data 30 is deleted. In this case, a front portion 30a of the original data 30 needs not to refer to the deleted tail portion 30b. Therefore, the front portion 30a of the original data 30 can be used as data 31 after editing.

Figure 10C:
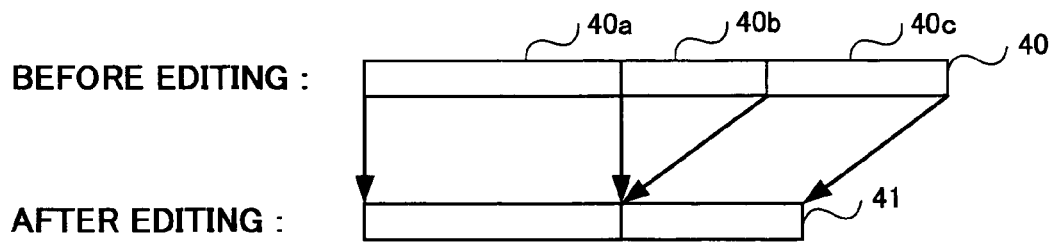

FIG. 10C shows a case where a middle portion 40b of original data 40 is deleted. In this case, a front portion 40a of the original data 40 is kept as it is, and a portion near the head of a tail portion 40c which is behind the deleted middle portion 40b is converted into a closed GOP, or a GOP which does not include a B picture.

Figure 10D:
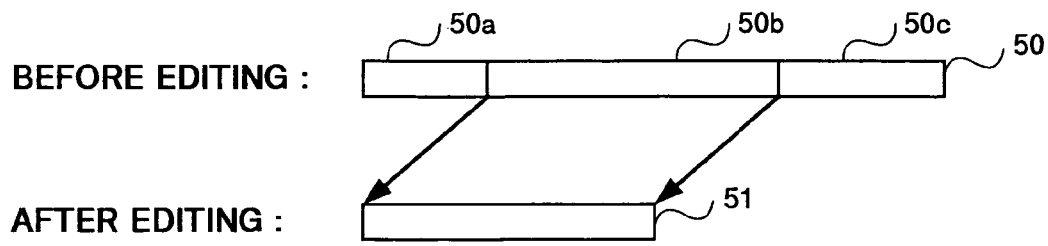

FIG. 10D shows a case where a front portion 50a and a tail portion 50c of original data 50 are deleted, and a middle portion 50b is kept. In this case, a portion near the head of the kept middle portion 50b is converted into a closed GOP or a GOP which does not include a B picture to create data 51 after editing.

Figure 10E:
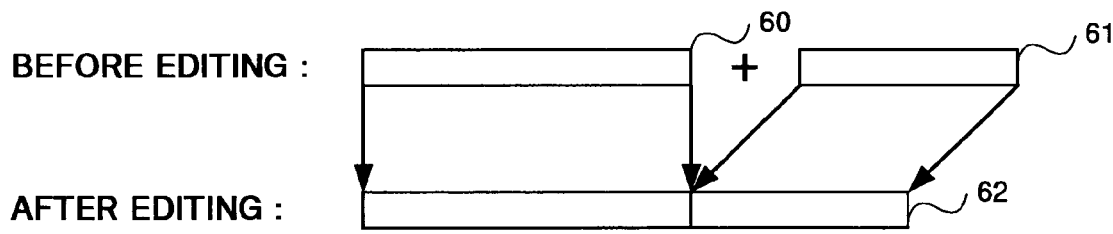

FIG. 10E shows a case where data 60 and data 61 are concatenated to create integrated data 62. In this case, after a portion near the head of the data 61 is converted into a closed GOP or a GOP which does not include a B picture, the data 60 and the data 61 are concatenated.

Figure 10F:
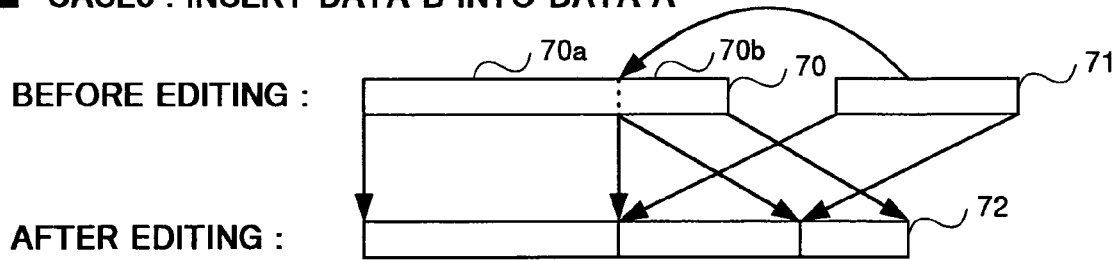

FIG. 10F shows a case where first data 70 is divided into two data 70a and 70b, and second data 71 is inserted between the two data 70a and 70b, so that new data 72 is created. In this case, a portion near the head of the inserted second data 71 is converted into a closed GOP or a GOP which does not include a B picture. Further, a portion near the head of the data 70b is converted into a closed GOP or a GOP which does not include a B picture.

By combining the above-described basic patterns of editing, MPEG video data can be edited into any forms.

Figure 11:
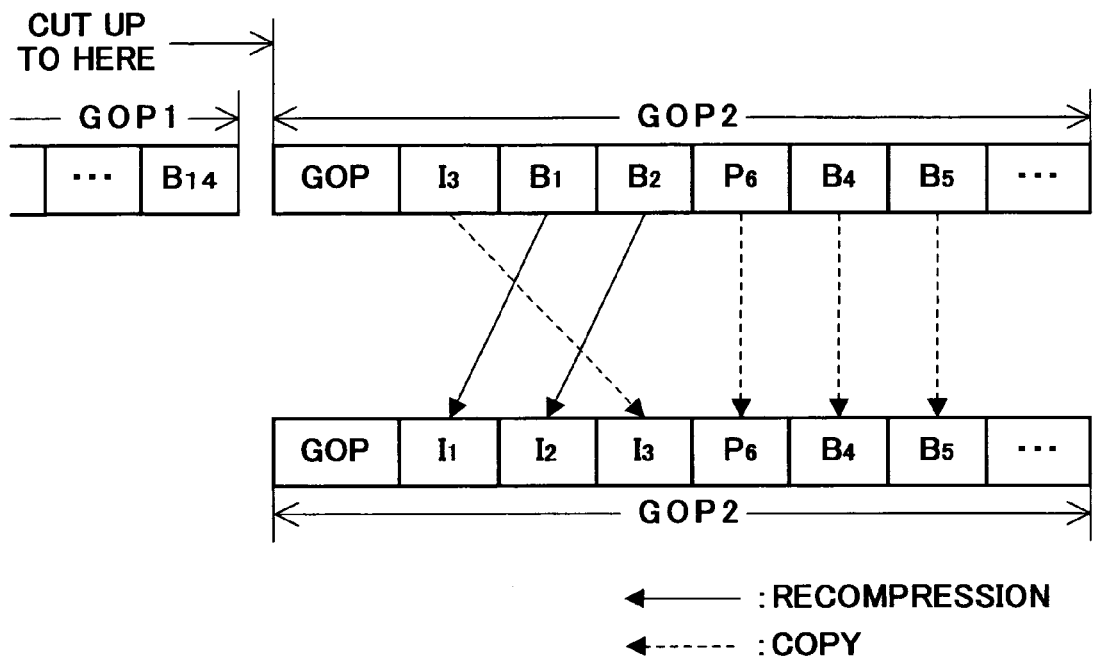
FIG. 11 to FIG. 14 are concept diagrams showing examples of MPEG video data editing schemes performed by an MPEG video editing apparatus according to other embodiments of the present invention.

In the above-described embodiment, in a case where the head frame in the area to be edited is an I picture, the MPEG video editing apparatus 10 converts each B picture following the I picture into an I picture, and creates a GOP made of only the I pictures created by conversion. However, as shown in FIG. 11 the I pictures created by conversion may be included in the GOP in which the I picture which is the head of the area to be edited is included. In this case, since the I pictures created by conversion are ahead of the I picture which is the head of the area to be edited in the order of reproducing the video data, the GOP is structured in the order shown in FIG. 11.

In a case where the head frame in the area to be edited is an I picture, the MPEG video editing apparatus 10 may be structured so that each B picture following the I picture may not be converted into an I picture, but into a B picture which is edited by backward prediction by which the last I picture or P picture of a GOP arranged one ahead is not referred to. That is, after the MPEG video editing apparatus 10 expands each B picture following the I picture which is the head of the area to be edited, the MPEG video editing apparatus 10 may recompress each B picture into a B picture by referring only to the I picture which is the head of the area to be edited. This method is effective in a case where an image frame which is the head of an area to be edited has little relevance to the previous image frame, such as a case of editing video data at a scene change portion.

Figure 12:
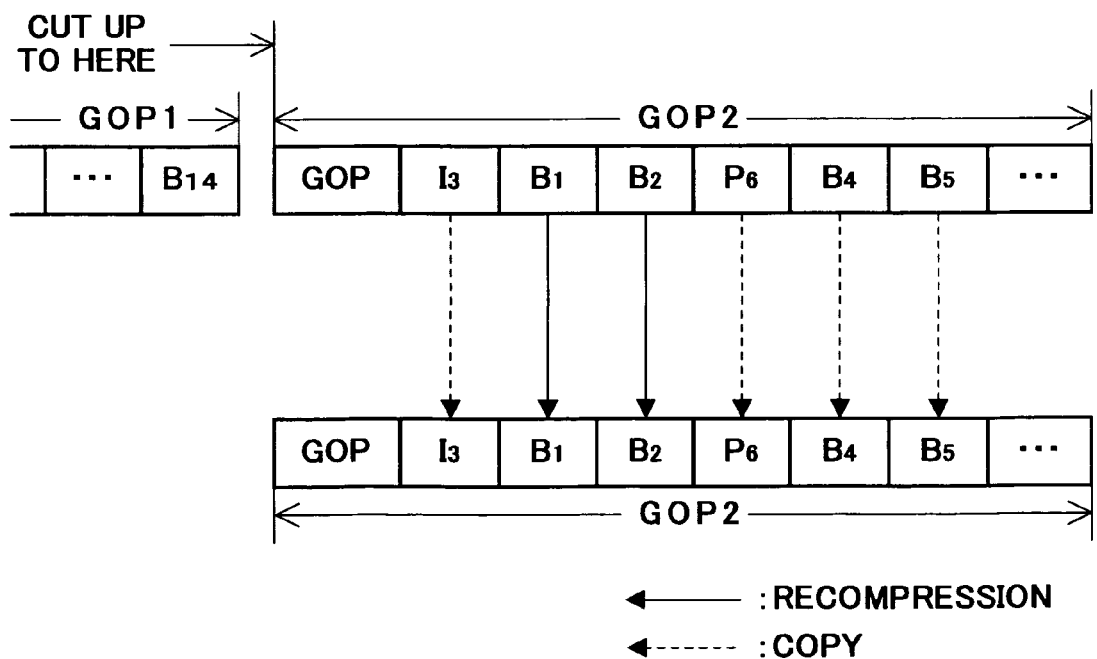

In a case where the head frame in the area to be edited is a P picture or a B picture, the MPEG video editing apparatus 10 may be structured so that the GOP 2 shown in FIG. 11 or FIG. 12 is created instead of the GOP 2-1, the GOP 2-2, and the GOP 2-3 shown in FIG. 8.

Figure 13:
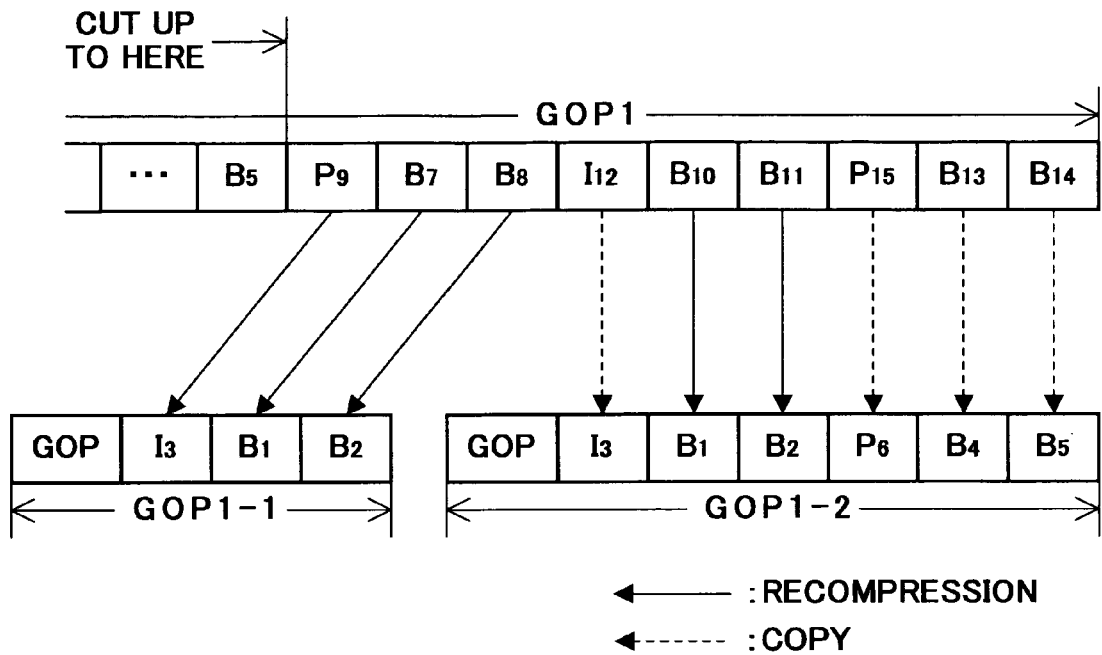
Figure 14:
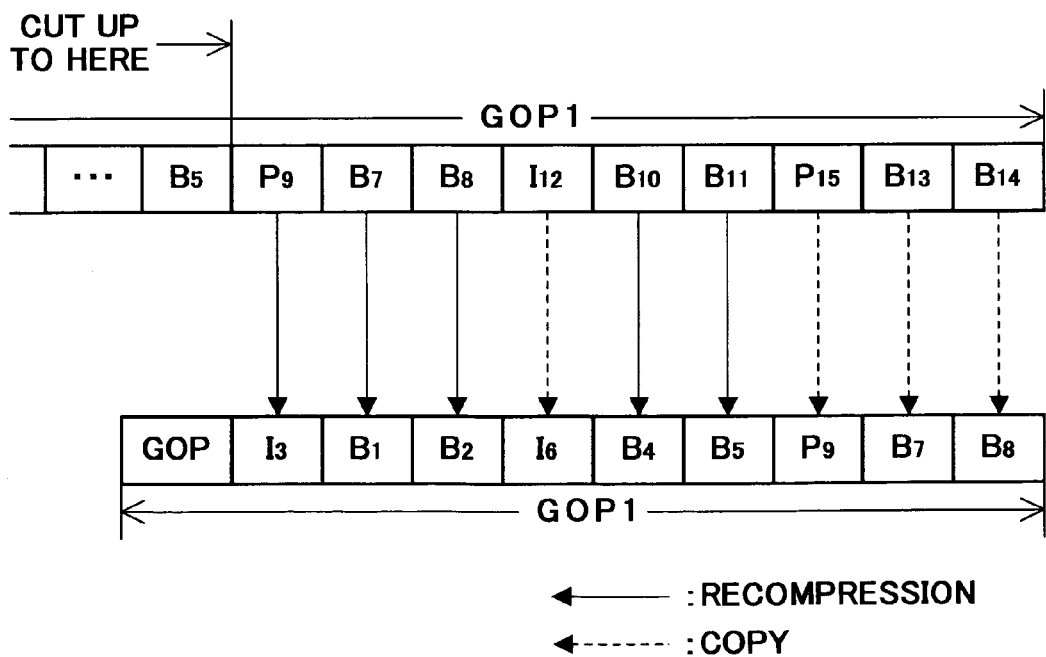

Further, in the above-described embodiment, an I picture is arranged only at the head of a GOP in order to make the explanation easier. However, the MPEG video editing method explained in the above embodiment is applicable to a case where an I picture is arranged in the middle of a GOP by modifying the above embodiment. That is, if an I picture appears in the editing process, "whether the I picture is a head frame of a GOP or not, and whether or not the GOP is a closed GOP or not" may be determined instead of determining "whether the GOP including the I picture is a closed GOP or not". For example, in a case where the head frame of the area to be edited is an I picture, the video data analyzer 5 determines "whether the I picture is a head frame of a GOP or not, and whether the GOP is a closed GOP or not" in step S10 in FIG. 5. In a case where determined as YES, the process flow may go to step S16 likewise the above-described embodiment. In a case where determined as NO, each B picture following the I picture needs to refer to an I picture or a P picture before this I picture, the process flow may go to step S11 likewise the above-described embodiment in order to perform step S11 to step S15. In a case where determined that "the I picture is not the head frame of a GOP" in step S10, the head frame of the GOP is an I picture. Therefore, in step S15, there is no need to return to a GOP arranged one ahead in order to expand a B picture. Instead, by going back to an I picture which is arranged before the I picture which is arranged before the B picture (the I picture which is determined as a non-head frame of a GOP in step S10), the I picture or a P picture may be expanded. Likewise, in a case where a head frame of the area to be edited is a P picture or a B picture, the video data analyzer 5 determines "whether the I picture (the I picture detected in step S24) is a head frame of a GOP or not, and whether the GOP is a closed GOP or not" in step S26 shown in FIG. 6B. Then, the MPEG video editing apparatus 10 converts each B picture following the I picture into an I picture, and creates a GOP made of only the I pictures created by conversion likewise the above-described embodiment. Or, the MPEG video editing apparatus 10 may be structured so that each B picture following the I picture is recompressed into a B picture, and thus created B pictures are included in the GOP in which the I picture is included, as shown in FIG. 13. Or, the MPEG video editing apparatus 10 may be structured so that a picture before the I picture, the I picture, and the following B pictures are included in a frame GOP, as shown in FIG. 14.

In the above embodiment, in a case where a head frame of the area to be edited is a B picture, an I picture or a P picture which is arranged before this B picture may be added to the head of the area to be edited.

One embodiment of a MPEG video editing apparatus for editing MPEG video data has been explained as described above. However, the present invention is not limited to editing MPEG video data, but is applicable to an image editing apparatus which edits video data which is coded as indicated below by a coding method similar to MPEG.

A plurality of image frames are divided into groups, and the groups are used as the managing unit of the image data.

Each group is made of a first type frame which is created by coding only data enclosed in the frame, a second type frame which is created by performing inter-frame prediction mono-directionally based on a past frame and coding a difference, and a third type frame which is created by performing inter-frame prediction dual-directionally based on a past frame and a future frame and coding differences.

The head frame of each group is the first type frame.

As described in the explanation of the above embodiment, each component of the image editing apparatus according to the present invention may be realized by a dedicated circuit. Or, the image editing apparatus may be constituted by a general purpose microprocessor and a memory, and the microprocessor may realize the function of each component by executing a program. Or, some of the components may be realized by dedicated circuits, and the other components may be realized by a general purpose microprocessor which executes a program for realizing the functions of those components. In such a structure, an application specific processor may be used instead of the general purpose processor.

In a case where the image editing apparatus according to the present invention is incorporated in a computer such as a personal computer or the like, some or all of the components of the image editing apparatus may be realized by a processor of the computer which executes a program for realizing the functions of the components.

In a case where a microprocessor, an application specific processor, or a computer such as a personal computer is used, a program for realizing the functions of the components of the image editing apparatus may be incorporated thereinto in the form of a ROM, or may be installed thereinto from a medium which stores the program. The program may be presented in a BBS (Bulletin Board System) on a network or in a web page, and distributed via the network. Or, a carrier wave may be modulated by a signal representing this program, and the obtained modulated wave may be transmitted. An apparatus which receives the modulated wave may restore the program by demodulating the modulated wave.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-015343 filed on Jan. 24, 2001 and including specification, claims, drawings and summary. The disclosure of the above Japanese Patent Application is incorporated herein by reference in its entirety.

What is claimed is:

1. An image editing apparatus which edits image data which has been coded in accordance with an image coding method, wherein a plurality of image frames constituting the image data are divided into groups, each image frame is coded into one of a first type image frame which is created by coding data in the image frame, a second type image frame which is created by performing inter-frame mono-directional prediction based on a past image frame and coding a difference obtained by the prediction, and a third type image frame which is created by performing inter-frame dual-directional prediction based on a past image frame and a future image frame and coding differences obtained by the prediction, and the plurality of image frames are coded so that a head frame of each group may be the first type image frame, said apparatus comprising:

an image coder which codes each of frames of image data into one of the first type image frame, the second type image frame, and the third type image frame;

an image decoder which decodes the image frame coded by said image coder; and an image data analyzer which analyzes a picture header of a head frame in the area to be edited and determines types of image frames included in each group, wherein said image data analyzer determines whether or not a head group which is arranged at a head of an editing target area included in the image data is a closed group which does not include the third type image frame which is to be decoded by referring to an image frame included in a group which is arranged before the head group; and in a case where said image data analyzer determines that the head group is not the closed group, said image coder converts a portion near the head of the editing target area into the closed group, wherein:

said image coding method is an MPEG method;

each of the groups is a GOP of MPEG;

the first type image frame is an I picture;

the second type image frame is a P picture; and the third type image frame is a B picture; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

2. The image editing apparatus according to claim 1, wherein said image data analyzer determines whether or not the third type image frame included in the head group is an image frame which is to be decoded by referring to an image frame included in a group which is arranged before the head group.

3. The image editing apparatus according to claim 2, wherein:

in a case where said image data analyzer determines that the third type image frame is to be decoded by referring to an image, frame included in the group arranged before the head group, the image decoder decodes the third type image frame; and said image coder codes the third type image frame which is determined by said image data analyzer as an image frame to be decoded by referring to an image frame included in the group arranged before the head group, and is decoded by said image decoder, into an image frame which is able to be decoded without referring to an image frame included in the group arranged before the head group.

4. An image editing apparatus which edits image data which has been coded in accordance with an MPEG method, said apparatus comprising:

image data analyzing means for analyzing a picture header of a head frame in the area to be edited and a structure of image frames included in each GOP of the image data, and determining an attribute of each GOP and picture types of image frames included in each GOP;

conversion point detecting means for detecting a GOP which needs to be re-coded from an editing target area of the image data, and an image frame which needs to be re-coded from the detected GOP;

image decoding means for decoding the image frame which needs to be re-coded detected by said conversion point detecting means;

GOP converting means for creating a new GOP by re-coding the image frame decoded by said image expanding means; and image data concatenating means for concatenating a plurality of image data which are cut out as editing target areas, wherein said image data analyzing means determines whether or not a head GOP which is arranged at a head of the editing target area is a closed GOP; and in a case where said image data analyzing means determines that the head GOP of the editing target area is not a closed GOP, said GOP converting means converts a portion near the head of the editing target area into a closed GOP; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

5. An image editing apparatus which edits image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said apparatus comprising:

an image encoder which codes each of frames of image data into one of the first type image frame, the second type image frame, and the third type image frame in accordance with said image coding method;

an image decoder which decodes the image frame coded by said image encoder; and an image data analyzer which analyzes a picture header of a head frame in the area to be edited and determines types of image frames included in each group, wherein in a case where said image data analyzer determines that a head image frame which is arranged at a head of an editing target area included in the image data is not the first type image frame, said image decoder decodes the head image frame, and each image frame appearing between the head image frame and the first type image frame which appears first after the head image frame; and said image encoder re-codes the image frames which are created by decoding the head image frame and each image frame appearing between the head image frame and the first type image frame which appears first after the head image frame, and re-codes the head image frame into the first type image frame, and re-codes any of the third type image frame appearing after the head image frame into an image frame which is able to be decoded without referring to an image frame arranged before the head image frame; wherein said image coding method is an MPEG method;

each of the groups is a GOP of MPEG;

the first type image frame is an I picture;

the second type image frame is a P picture; and the third type image frame is a B picture; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

6. The image editing apparatus which edits image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said apparatus comprising:

an image encoder which codes each of frames of image data into one of the first type image frame, the second type image frame, and the third type image frame in accordance with said image coding method;

an image decoder which decodes the image frame coded by said image encoder; and an image data analyzer which determines types of image frames included in each group, wherein in a case where said image data analyzer which analyzes a picture header of a head frame in the area to be edited and determines that a head image frame which is arranged at a head of an editing target area included in the image data is not the first type image frame, said image decoder decodes the head image frame, and each image frame appearing between the head image frame and the first type image frame which appears first after the head image frame;

said image encoder re-codes the image frames which are created by decoding the head image frame and each image frame appearing between the head image frame and the first type image frame which appears first after the head image frame, and re-codes the head image frame into the first type image frame, and re-codes any of the third type image frame appearing after the head image frame into an image frame which is able to be decoded without referring to an image frame arranged before the head image frame, and wherein:

in a case where said image data analyzer determines that the head image frame of the editing target area is not the first type image frame, the image decoder decodes any of third type image frames that appear after a first type image frame which appears first after the head image frame if any of the third type image frames is an image frame which is to be decoded by referring to an image frame which is arranged before the first type image frame; and said image encoder re-codes the image frame which is created by decoding any of the third type image frame that appears after the first type image frame which appears first after the head image frame; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

7. The image editing apparatus according to claim 5, wherein when said image encoder re-codes the image frames which are created by decoding each frame appearing between the head image frame and the first type image frame which appears first after the head image frame, said image encoder re-codes any of the third type image frame that appears after the head image frame into the third type image frame that is able to be decoded without referring to an image frame which is arranged before the head image frame.

8. The image editing apparatus according to claim 5, wherein:

in a case where said image data analyzer determines that the head image frame of the editing target area is the first type image frame, said image decoder decodes any of the third type image frame that appears after the head image frame; and said image encoder re-codes the image frame which is created by decoding any of the third type image frame that appears after the head image frame into an image frame which is able to be decoded without referring to an image frame which is arranged before the head image frame.

9. The image editing apparatus according to claim 5, wherein:

in a case where said image data analyzer determines that the head image frame of the editing target area is the first type image frame, said image decoder decodes any of the third type image frame that appears after the head image frame; and said image encoder re-codes the image frame which is created by decoding any of the third type image frame that appears after the head image frame into the first type image frame.

10. The image editing apparatus according to claim 5, wherein:

in a case where said image data analyzer determines that the head image frame of the editing target area is the first type image frame, said image decoder decodes any of the third type image frame that appears after the head image frame; and said image encoder re-codes the image frame which is created by decoding any of the third type image frame that appears after the head image frame into the third type image frame which is able to be decoded without referring to an image frame which is arranged before the head image frame.

11. An image editing apparatus which edits image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said apparatus comprising:

an image encoder which codes each of frames of image data into one of the first type image frame, the second type image frame, and the third type image frame in accordance with said image coding method;

an image decoder which decodes the image frame coded by said image encoder; and an image data analyzer which analyzes a picture header of a head frame in the area to be edited and determines types of image frames included in each group, wherein said image data analyzer determines whether a first condition that the first type image frame which appears first in an editing target area included in the image data coded in accordance with said image coding method is a head image frame which is arranged at a head of a group, and a second condition that the group is a closed group which does not include the third type image frame which is to be decoded by referring to an image frame included in a group which is arranged before the group are satisfied or not; in accordance with a result of determining the first condition and the second condition, said image decoder decodes any of the third type image frame that appears after the first type image frame appearing first in the editing target area and that needs to be re-coded; and said image encoder re-codes the image frame which is created by decoding any of the third type image frame that appears after the first type image frame which appears first in the editing target are; wherein said image coding method is an MPEG method;

each of the groups is a GOP of MPEG;

the first type image frame is an I picture;

the second type image frame is a P picture; and the third type image frame is a B picture; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

12. The image editing apparatus according to claim 11, wherein:
in a case where said image data analyzer determines that one of the first condition and the second condition is not satisfied, said image decoder decodes any of the third type image frame that appears after the first type image frame which appears first in the editing target area; and
said image encoder re-codes the image data which is created by decoding any of the third type image frame that appears after the first type image frame which appears first in the editing target area.

13. The image editing apparatus according to claim 11, wherein:
in a case where said image data analyzer determines that the first condition is satisfied and the second condition is not satisfied, said image encoder re-codes the image frame which is created by decoding any of the third type image frame that appears after the first type image frame which appears first in the editing target area into the first type image frame.

14. The image editing apparatus according to claim 11, wherein in a case where said image data analyzer determines that the first condition is satisfied and the second condition is not satisfied, said image encoder re-codes the image frame which is created by decoding any of the third type image frame that appears after the first type image frame which appears first in the editing target area into the third type image frame which is able to be decoded without referring to an image frame which is arranged before the head image frame.

15. The image editing apparatus according to claim 11, wherein in a case where said image data analyzer determines that the first condition and the second condition are satisfied, said image editing apparatus copies the image frame which is created by decoding any of the third type image frame that appears after the first type image frame which appears first in the editing target area to the image data after being edited.

16. An image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the plurality of image frames are coded so that a head frame of each group may be the first type image frame, said image editing method comprising:
setting an editing target area in the image data which has been coded in accordance with said image coding method;
determining whether a head group which is arranged at a head of the editing target area is a closed group which does not include the third type image frame which is to be decoded by referring to an image frame included in a group which is arranged before the head group;
converting a portion near the head of the editing target area into the closed group in a case where said determining determines that the head group is not the closed group;

determining whether any of the third type image frame included in the head group of the editing target area is an image frame which is to be decoded by referring to an image frame included in a group which is arranged before the head group;
decoding any of the third type image frame determined as an image frame which is to be decoded by referring to an image frame included in a group which is arranged before the head group; and
coding any of the decoded third type image frame into an image frame which is able to be decoded without referring to an image frame included in a group which is arranged before the head group; and wherein
said image coding method is an MPEG method;
each of the groups is a GOP of MPEG;
the first type image frame is an I picture;
the second type image frame is a P picture; and
the third type image frame is a B picture; and
wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

17. An image editing method for editing image data which has been coded in accordance with an MPEG method, said image editing method comprising:
setting one or more editing target areas in the coded image data;
determining whether a head GOP which is arranged at a head of each of the one or 5 more editing target areas is a closed GOP;
determining a picture type of a head image frame which is arranged at the head of each editing target area;
detecting a GOP which needs to be re-coded, and an image frame which is included in the GOP and needs to be re-coded in accordance with a result of said determining whether a head GOP of each editing target area is a closed GOP, and a result of said determining a picture type of a head image frame of each editing target area;
re-coding the detected image frame which needs to be re-coded, after it is decoded,
determining a picture type of a next image frame which is arranged next to the head image frame of each editing target area, in a case where said determining whether a head GOP is a closed GOP determines that the head GOP of each editing target area is not a closed GOP;
decoding the next image frame and following image frames which are B pictures, in a case where said determining a picture type of a next image frame determines that the next image frame is a B picture, after decoding an image frame which is an I picture which is encountered first when going back in a reverse direction from the head image frame, each image frame between the encountered image frame and the head image frame, and the head image frame;
re-coding each decoded image frame, and re-coding the image frames which are created by decoding the following image frames which are B pictures into image frames which are able to be decoded without referring to an image frame which is arranged before the head image frame; and recording each of the image frames which are created by re-coding the head image frame and the following image frames which are B pictures after those image frame are decoded, and wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

18. The image editing method according to claim 17, further comprising:

decoding the head image frame of each editing target area in a case where said determining a picture type of a head image frame determines that the head image frame is a P picture, and also decoding each image frame appearing after the head image frame and before an image frame which is an I picture which appears first after the head image frame; and re-coding the image frames which are created by decoding the head image frame and each image frame appearing after the head image frame, and re-coding the image frame which is created by decoding the head image frame into an image frame which is an I picture.

19. The image editing method according to claim 17, further comprising:

expanding the image frame which needs to be re-coded by decoding:

creating a new GOP by re-coding the image frame which is decoded by said expanding; and concatenating the one or more editing target areas.

20. An image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said image editing method comprising:

setting an editing target area in the image data which has been coded in accordance with said image coding method;

determining a type of a head image frame which is arranged at a head of the editing target area;

decoding the head image frame of the editing target area and each image frame appearing between the head image frame and the first type image frame which appears first after the head image frame, in a case where said determining a type determines that the head image frame is not the first type image frame; and re-coding the image frames created by decoding the head image frame and each image frame appearing between the head image frame and the first type image frame which appears first after the head image frame, and re-coding the head image frame into the first type image frame, and re-coding any of the third type image frame that appears after the head image frame into an image frame which is able to be decoded without referring to an image frame which is arranged before the head image frame; wherein:

said image coding method is an MPEG method;
each of the groups is a GOP of MPEG;
the first type image frame is an I picture;
the second type image frame is a P picture;
the third type image frame is a B picture; and
wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

21. An image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said image editing method comprising:

setting an editing target area in the image data which has been coded in accordance with said image coding method;

determining a type of a head image frame which is arranged at a head of the editing target area;

decoding the head image frame of the editing target area and each image frame appearing between the head image frame and the first type image frame which appears first after the head image frame, in a case where said determining a type determines that the head image frame is not the first type image frame; and re-coding the image frames created by decoding the head image frame and each image frame appearing between the head image frame and the first type image frame which appears first after the head image frame, and re-coding the head image frame into the first type image frame, and re-coding any of the third type image frame that appears after the head image frame into an image frame which is able to be decoded without referring to an image frame which is arranged before the head image frame, and further comprising:

decoding any of third type image frames that appear after the first type image frame which appears first after the head image frame if any of the third type image frame is an image frames which is to be decoded by referring to an image frame which is arranged before the first type image frame, in a case where said determining a type determines that the head image frame of the editing target area is not the first type image frame; and re-coding the image frame which is created by decoding any of the third type image frame that appears after the first type image frame which appears first after the head image frame; wherein:

said image coding method is an MPEG method;
each of the groups is a GOP of MPEG;
the first type image frame is an I picture;
the second type image frame is a P picture;
the third type image frame is a B picture; and
wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

22. The image editing method according to claim 20, further comprising
re-coding the image frames created by decoding the head image frame and each image frame appearing between the head image frame and the first type image frame which appears first after the head image frame, and re-coding any of the third type image frame that appears after the head image frame into the third type image frame which is able to be decoded without referring to an image frame which is arranged before the head image frame.

23. The image editing method according to claim 20, further comprising:
decoding any of the third type image frame that appears after the head image frame of the editing target area in a case where said determining a type determines that the head image frame is the first type image frame; and
re-coding the image frame which is created by decoding any of the third type image frame that appears after the head image frame into an image frame which is able to be decoded without referring to an image frame which is arranged before the head image frame.

24. The image editing method according to claim 20, further comprising:
decoding any of the third type image frame that appears after the head image frame of the editing target area in a case where said determining a type determines that the head image frame is the first type image frame; and
re-coding the image frame which is created by decoding any of the third type image frame that appears after the head image frame into the first type image frame.

25. The image editing method according to claim 20, further comprising:
decoding any of the third type image frame that appears after the head image frame of the editing target area in a case where said determining a type determines that the head image frame is the first type image frame; and
re-coding the image frame which is created by decoding any of the third type image frame that appears after the head image frame into the third type image frame which is able to be decoded without referring to an image frame which is arranged before the head image frame.

26. An image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said image editing method comprising:
setting an editing target area in the image data which has been coded in accordance with said image coding method;
determining whether a first condition that the first type image frame which appears first in the editing target area is a head image frame which is arranged at a head of a group and a second condition that the group is a closed group which does not include the third type image frame which is to be decoded by referring to an image frame included in a group which is arranged before the group are satisfied or not;
decoding any of the third type image frame that appears after the first type image frame which appears first in the editing target area and that needs to be re-coded, in accordance with a result of determining the first condition and the second condition; and
re-coding the image frame which is created by decoding any of the third type image frame that appears after the first type image frame which appears first in the editing target area; wherein:
said image coding method is an MPEG method;
each of the groups is a GOP of MPEG;
the first type image frame is an I picture;
the second type image frame is a P picture;
the third type image frame is a B picture; and
wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

27. The image editing method according to claim 26, further comprising:
decoding any of the third type image frame that appears after the first type image frame which appears first in the editing target area, in a case where said determining determines that one of the first condition and the second condition is not satisfied; and
re-coding the image frame which is created by decoding any of the third type image frame that appears after the first type image frame which appears first in the editing target area.

28. The image editing method according to claim 26, further comprising
re-coding the image frame which is created by decoding any of the third type image frame that appears after the first type image fame which appears first in the editing target area into the first type image frame, in a case where said determining determines that the first condition is satisfied, and the second condition is not satisfied.

29. The image editing method according to claim 26, further comprising
re-coding the image frame which is created by decoding any of the third type image frame that appears after the first type image fame which appears first in the editing target area into the third type image frame which is able to be decoded without referring to an image frame which is arranged before the head image frame, in a case where said determining determines that the first condition is satisfied, and the second condition is not satisfied.

30. The image editing method according to claim 26, further comprising copying the image frame which is created by decoding any of the third type image frame that appears after the first type image frame which appears first in the editing target area to the image data after being edited, in a case where said determining determines that the first condition and the second condition are satisfied.

31. An image editing method for editing image data which has been coded in accordance with an image coding method, wherein a plurality of image frames constituting the image data are divided into groups, each image frame is coded into one of a first type image frame which is created by coding based on data in the image frame, a second type image frame which is created by performing inter-frame mono-directional prediction based on a past image frame, and a third type image frame which is created by performing inter-frame dual-directional prediction based on a past image frame and a future image frame, and the image data is coded so that a head frame of each group may be the first type image frame, said image editing method comprising:

setting an editing target area in the image data which has been coded in accordance with said image coding method;

determining whether a first condition that the first type image frame which appears first in the editing target area is a head image frame which is arranged at a head of a group and a second condition that the group is a closed group which does not include the third type image frame which is to be decoded by referring to an image frame included in a group which is arranged before the group are satisfied or not;

decoding any of the third type image frame that appears after the first type image frame which appears first in the editing target area and that needs to be re-coded, in accordance with a result of determining the first condition and the second condition; and re-coding the image frame which is created by decoding any of the third type image frame that appears after the first type image frame which appears first in the editing target area, further comprising inserting a first or second type image frame which appears immediately before a head image frame which is arranged at the head of the editing target area into the head of the editing target area, in a case where the head image frame is the third type image frame; wherein:

said image coding method is an MPEG method;
each of the groups is a GOP of MPEG;
the first type image frame is an I picture;
the second type image frame is a P picture;
the third type image frame is a B picture; and wherein in a case where it is determined that a second GOP next to a first GOP to which a start point of an editing target area belongs is not a closed GOP, said second GOP is converted into a closed GOP by converting frames in the editing target area between an I picture at a head of the second GOP and a P picture such that the second GOP includes no B picture.

32. An image editing apparatus which edits image data which has been coded in accordance with an image coding method, wherein a plurality of image frames constituting the image data are divided into groups, each image frame is coded into one of a first type image frame which is created by coding data in the image frame, a second type image frame which is created by performing inter-frame mono-directional prediction based on a past image frame and coding a difference obtained by the prediction, and a third type image frame which is created by performing inter-frame dual directional prediction based on a past image frame and a future image frame and coding differences obtained by the prediction, and the plurality of image frames are coded so that a head frame of each group may be the first type image frame, said apparatus comprising:

an image coder which codes each of frames of image data into one of the first type image frame, the second type image frame, and the third type image frame;

an image decoder which decodes the image frame coded by the image coder; and an image data analyzer which detects a head group which is arranged at a head of an editing target area included in the image data and determines types of image frames included in each group, wherein: said image data analyzer determines whether or not the head group which is arranged at a head of the editing target area included in the image data is a closed group which does not include the third type image frame which is to be decoded by referring to an image frame included in a group which is arranged before the head group; and in a case where said image data analyzer determined the head group is not the closed group which does not include the third type image frame, said image coder converts a portion near the head of the editing target area into the closed group, wherein:

said image coding method is an MPEG method;
each of the groups is a GOP of MPEG;
the first type image frame is an I picture;
the second type image frame is a P picture: and
the third type image frame is a B picture; and wherein in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

33. An image editing apparatus which edits image data which has been coded in accordance with an MPEG method, said apparatus comprising:

image data analyzing means for analyzing a structure of image frames included in each GOP of the image data, and determining an attribute of each GOP and picture types of image frames included in each GOP;

conversion point detecting means for detecting a GOP which needs to be re-coded from an editing target area of the image data, and an image frame which needs to be re-coded from the detected GOP;

image decoding means for decoding the image frame which needs to be re-coded detected by said conversion point detecting means;

GOP converting means for creating a new GOP by re-coding the image frame decoded by said image expanding means; and image data concatenating means for concatenating a plurality of image data which are cut out as editing target areas, wherein: said image data analyzing means detects a head GOP which is arranged at a head of the editing target area and determines whether or not the head GOP which is arranged at the head of the editing target area is a closed GOP; and in a case where said image data analyzing means determines that the head GOP of the editing target area is not a closed GOP, said GOP converting means converts a portion near the head of the editing target area into a closed GOP including no B picture, wherein:

said image coding method is an MPEG method;
each of the groups is a GOP of MPEG;
the first type image frame is an I picture;
the second type image frame is a P picture; and
the third type image frame is a B picture; and wherein
in a case where said image data analyzer determines that a second GOP next to a first GOP to which a start point of an editing target area belongs is not a closed GOP, said image coder converts the second GOP into a closed GOP by converting frames in the editing target area between an I picture at a head of the second GOP and a P picture such that the second GOP includes no B picture.

* * * * *